(12) United States Patent
Filimonova

(10) Patent No.: US 10,706,320 B2
(45) Date of Patent: *Jul. 7, 2020

(54) DETERMINING A DOCUMENT TYPE OF A DIGITAL DOCUMENT

(71) Applicant: ABBYY PRODUCTION LLC, Moscow (RU)

(72) Inventor: Irina Zosimovna Filimonova, Moscow (RU)

(73) Assignee: ABBYY Production LLC, Moscow (RU)

(*) Notice: Subject to any disclaimer, the term of this patent is extended or adjusted under 35 U.S.C. 154(b) by 0 days.

This patent is subject to a terminal disclaimer.

(21) Appl. No.: 16/175,364

(22) Filed: Oct. 30, 2018

(65) Prior Publication Data

US 2019/0065894 A1 Feb. 28, 2019

Related U.S. Application Data

(63) Continuation of application No. 15/197,143, filed on Jun. 29, 2016, now Pat. No. 10,152,648.

(30) Foreign Application Priority Data

Jun. 22, 2016 (RU) ................................ 2016124834

(51) Int. Cl.
*G06K 9/00* (2006.01)
*G06K 9/62* (2006.01)
*G06K 9/46* (2006.01)

(52) U.S. Cl.
CPC ....... *G06K 9/6202* (2013.01); *G06K 9/00442* (2013.01); *G06K 9/00469* (2013.01);
(Continued)

(58) Field of Classification Search
CPC .... G06K 9/6202; G06K 9/6218; G06K 9/628; G06K 9/6262; G06K 9/626; G06K 9/46;
(Continued)

(56) References Cited

U.S. PATENT DOCUMENTS 5,025,484 A 6/1991 Yamanari et al.
5,031,225 A 7/1991 Tachikawa et al.
(Continued)

OTHER PUBLICATIONS

Xu et al. "A Hierarchical Classification Model for Document Categorization", 2009, pp. 486-490, IEEE, Washington DC,USA.
(Continued)

*Primary Examiner* — Aaron W Carter
(74) *Attorney, Agent, or Firm* — Lowenstein Sandler LLP

(57) ABSTRACT

Disclosed are systems and method for determining document type of a digital document. An example method comprises: executing a first MLA classifier in order to determine a document type for a digital document, wherein the first MLA classifier is associated with a first hierarchical order of execution, and wherein the first MLA classifier is trained on a first trained dataset containing a first document type and a second document type, wherein the first document type is confidently predictable by the first MLA classifier and the second document type is not confidently predictable by the first MLA classifier; and responsive to determining that the first MLA classifier produced the second document type for the digital document, executing a second MLA classifier in order to determine the document type for the digital document, wherein the second MLA classifier is associated with a second hierarchical order of execution following the first hierarchical order of execution, and wherein the second MLA classifier is trained on a second trained dataset containing no documents of the first document type.

20 Claims, 8 Drawing Sheets

(52) U.S. Cl.
CPC .............. *G06K 9/46* (2013.01); *G06K 9/626* (2013.01); *G06K 9/628* (2013.01); *G06K 9/6262* (2013.01); *G06K 9/6281* (2013.01); *G06K 2209/01* (2013.01)

(58) Field of Classification Search
CPC ........... G06K 9/00469; G06K 9/00442; G06K 2209/01; G06N 20/00; G06N 5/025; G06F 16/35
See application file for complete search history.

(56) References Cited

U.S. PATENT DOCUMENTS

| | | | |
|---|---|---|---|
| 5,050,222 A | 9/1991 | Lee | |
| 5,150,424 A | 9/1992 | Aguro et al. | |
| 5,182,656 A | 1/1993 | Chevion et al. | |
| 5,191,525 A | 3/1993 | LeBrun et al. | |
| 5,235,651 A | 8/1993 | Nafarieh | |
| 5,235,654 A | 8/1993 | Anderson et al. | |
| 5,257,328 A | 10/1993 | Shimizu | |
| 5,293,429 A | 3/1994 | Pizano et al. | |
| 5,386,508 A | 1/1995 | Itonori et al. | |
| 5,416,849 A | 5/1995 | Huang | |
| 5,461,459 A | 10/1995 | Muramatsu et al. | |
| 5,463,773 A | 10/1995 | Sakakibara et al. | |
| 5,471,549 A | 11/1995 | Kurosu et al. | |
| 5,592,572 A | 1/1997 | Le | |
| 5,642,443 A | 6/1997 | Goodwin et al. | |
| 5,793,887 A | 8/1998 | Zlotnick | |
| 5,852,676 A | 12/1998 | Lazar | |
| 5,877,963 A | 3/1999 | Leung et al. | |
| 5,937,084 A | 8/1999 | Crabtree et al. | |
| 5,982,934 A | 11/1999 | Villalba | |
| 5,982,952 A | 11/1999 | Nakashima | |
| 6,050,490 A | 4/2000 | Leichner et al. | |
| 6,055,540 A | 4/2000 | Snow et al. | |
| 6,075,875 A | 6/2000 | Gu | |
| 6,137,905 A | 10/2000 | Takaoka | |
| 6,148,119 A | 11/2000 | Takaoka | |
| 6,151,423 A | 11/2000 | Melen | |
| 6,169,822 B1 | 1/2001 | Jung | |
| 6,175,664 B1 | 1/2001 | Nakashima | |
| 6,201,894 B1 | 3/2001 | Saito | |
| 6,285,802 B1 | 9/2001 | Dennis et al. | |
| 6,427,032 B1 | 7/2002 | Irons et al. | |
| 6,481,624 B1 | 11/2002 | Hayduchok | |
| 6,519,580 B1 | 2/2003 | Johnson et al. | |
| 6,567,628 B1 | 5/2003 | Guillemin et al. | |
| 6,574,375 B1 | 6/2003 | Cullen et al. | |
| 6,633,406 B1 | 10/2003 | Imaizumi et al. | |
| 6,636,649 B1 | 10/2003 | Murata et al. | |
| 6,640,009 B2 | 10/2003 | Zlotnick | |
| 6,687,404 B1 | 2/2004 | Hull et al. | |
| 6,697,091 B1 | 2/2004 | Rzepkowski et al. | |
| 6,732,928 B1 | 5/2004 | Lawlor | |
| 6,760,490 B1 | 7/2004 | Zlotnick | |
| 6,778,703 B1 | 8/2004 | Zlotnick | |
| 6,798,905 B1 | 9/2004 | Sugiura et al. | |
| 6,804,414 B1 | 10/2004 | Sakai et al. | |
| 6,825,940 B1 | 11/2004 | Wu et al. | |
| 6,952,281 B1 | 10/2005 | Irons et al. | |
| 6,993,205 B1 | 1/2006 | Lorie et al. | |
| 7,151,860 B1 | 12/2006 | Sakai et al. | |
| 7,215,828 B2 | 5/2007 | Luo | |
| 7,251,380 B2 | 7/2007 | Zuev et al. | |
| 7,305,619 B2 | 12/2007 | Kaneda et al. | |
| 7,499,591 B2 | 3/2009 | Simske et al. | |
| 7,546,278 B2 | 6/2009 | Yang et al. | |
| 7,610,315 B2 | 10/2009 | Chang et al. | |
| 7,644,052 B1 | 1/2010 | Chang et al. | |
| 7,672,940 B2 | 3/2010 | Viola et al. | |
| 7,809,723 B2 | 10/2010 | Liu et al. | |
| 7,881,561 B2 | 2/2011 | Zuev et al. | |
| 8,489,585 B2 | 7/2013 | Larlus et al. | |
| 8,699,789 B2 | 4/2014 | Gordo et al. | |
| 8,713,007 B1 | 4/2014 | Korolev et al. | |
| 8,805,093 B2 | 8/2014 | Zuev et al. | |
| 9,349,178 B1 | 5/2016 | Itu et al. | |
| 9,367,814 B1 | 6/2016 | Lewis et al. | |
| 9,589,184 B1 | 3/2017 | Castillo et al. | |
| 9,633,257 B2 | 4/2017 | Filimonova et al. | |
| 10,152,648 B2 * | 12/2018 | Filimonova ........ | G06K 9/00442 |
| 2002/0065847 A1 | 5/2002 | Furukawa et al. | |
| 2002/0106128 A1 | 8/2002 | Zlotnick | |
| 2002/0159639 A1 | 10/2002 | Shima | |
| 2003/0018658 A1 | 1/2003 | Suermondt et al. | |
| 2003/0086721 A1 | 5/2003 | Guillemin et al. | |
| 2003/0126147 A1 | 7/2003 | Essafi et al. | |
| 2003/0145009 A1 | 7/2003 | Forman et al. | |
| 2003/0160095 A1 | 8/2003 | Segal | |
| 2003/0174179 A1 | 9/2003 | Suermondt et al. | |
| 2003/0197882 A1 | 10/2003 | Tsukuba et al. | |
| 2003/0200075 A1 | 10/2003 | Meng et al. | |
| 2003/0225763 A1 | 12/2003 | Guilak et al. | |
| 2004/0002980 A1 | 1/2004 | Bernhardt et al. | |
| 2004/0024769 A1 | 2/2004 | Forman et al. | |
| 2004/0161149 A1 | 8/2004 | Kaneda et al. | |
| 2004/0162814 A1 | 8/2004 | Bergholz et al. | |
| 2004/0162831 A1 | 8/2004 | Patterson | |
| 2004/0210834 A1 | 10/2004 | Duncan et al. | |
| 2005/0149846 A1 | 7/2005 | Shimizu et al. | |
| 2006/0010093 A1 | 1/2006 | Fan et al. | |
| 2006/0017959 A1 | 1/2006 | Downer et al. | |
| 2006/0028684 A1 | 2/2006 | Namizuka et al. | |
| 2006/0104511 A1 | 5/2006 | Guo et al. | |
| 2006/0262995 A1 | 11/2006 | Barrus et al. | |
| 2006/0274941 A1 | 12/2006 | Zuev et al. | |
| 2007/0059068 A1 | 3/2007 | Winter | |
| 2007/0195680 A1 | 8/2007 | Brinson, Jr. et al. | |
| 2007/0214186 A1 | 9/2007 | Yang et al. | |
| 2007/0288417 A1 | 12/2007 | Aggarwal et al. | |
| 2008/0059448 A1 | 3/2008 | Chang et al. | |
| 2008/0152237 A1 | 6/2008 | Sinha et al. | |
| 2009/0097071 A1 | 4/2009 | Tsukuba et al. | |
| 2009/0132477 A1 | 5/2009 | Zuev et al. | |
| 2009/0138466 A1 | 5/2009 | Henry et al. | |
| 2009/0152357 A1 | 6/2009 | Lei et al. | |
| 2009/0154778 A1 | 6/2009 | Lei et al. | |
| 2009/0164618 A1 | 6/2009 | Kudo | |
| 2009/0175532 A1 | 7/2009 | Zuev et al. | |
| 2009/0228777 A1 | 9/2009 | Henry et al. | |
| 2009/0252413 A1 | 10/2009 | Hua et al. | |
| 2009/0300046 A1 | 12/2009 | Abouyounes | |
| 2010/0082627 A1 * | 4/2010 | Lai ..................... | G06F 16/9535 707/738 |
| 2010/0185568 A1 | 7/2010 | Bates et al. | |
| 2010/0198758 A1 | 8/2010 | Gupta et al. | |
| 2011/0013806 A1 | 1/2011 | Zuev et al. | |
| 2011/0051999 A1 | 3/2011 | Tu et al. | |
| 2011/0052063 A1 * | 3/2011 | McAuley ............... | G06K 9/527 382/180 |
| 2011/0078152 A1 | 3/2011 | Forman et al. | |
| 2011/0091109 A1 | 4/2011 | Zuev et al. | |
| 2011/0188759 A1 | 8/2011 | Filimonova et al. | |
| 2012/0036094 A1 | 2/2012 | Takeguchi et al. | |
| 2012/0066166 A1 | 3/2012 | Curbera et al. | |
| 2012/0101974 A1 | 4/2012 | Duan et al. | |
| 2012/0136812 A1 | 5/2012 | Brdiczka | |
| 2012/0203752 A1 | 8/2012 | H-Thuc et al. | |
| 2012/0237116 A1 | 9/2012 | Xiao | |
| 2014/0095493 A1 | 4/2014 | Feuersanger et al. | |
| 2014/0122381 A1 | 5/2014 | Nowozin | |
| 2014/0201126 A1 | 7/2014 | Zadeh et al. | |
| 2014/0214835 A1 * | 7/2014 | Oehrle .................. | G06F 16/35 707/737 |
| 2014/0307959 A1 | 10/2014 | Filimonova et al. | |
| 2015/0016699 A1 | 1/2015 | Ritt et al. | |
| 2015/0071549 A1 * | 3/2015 | Chajed ............... | G06K 9/00456 382/199 |
| 2015/0120735 A1 | 4/2015 | Tsuchida et al. | |
| 2015/0378988 A1 | 12/2015 | Chewning et al. | |
| 2016/0071022 A1 | 3/2016 | Bruno et al. | |
| 2016/0078022 A1 | 3/2016 | Lisuk et al. | |
| 2016/0267355 A1 | 9/2016 | Piao et al. | |

(56) References Cited

U.S. PATENT DOCUMENTS

| | | |
|---|---|---|
| 2016/0307067 A1 | 10/2016 | Filimonova |
| 2016/0364608 A1 | 12/2016 | Sengupta et al. |
| 2017/0193291 A1* | 7/2017 | Lucchese ............ G06F 17/2715 |
| 2017/0351913 A1 | 12/2017 | Chen et al. |
| 2019/0050755 A1* | 2/2019 | Murakami ............... G06K 9/62 |
| 2019/0065894 A1* | 2/2019 | Filimonova ........ G06K 9/00442 |

OTHER PUBLICATIONS

Viola et al., "Rapid Object Detection Using a Boosted Cascade of Simple Features", IEEE, 2001.
Chen et al., "Classifier Cascade for Minimizing Feature Evaluation Cost", 2012.
Xu et al., "Cost-Sensitive Tree of Classifiers", 2013.

\* cited by examiner

DETERMINING A DOCUMENT TYPE OF A DIGITAL DOCUMENT

CROSS-REFERENCE TO RELATED APPLICATIONS

This application is a continuation of U.S. patent application Ser. No. 15/197,143 filed on Jun. 29, 2016, which claims the benefit of priority under 35 U.S.C. § 119 to Russian Patent Application No. 2016124834, filed Jun. 22, 2016. The entire content of both above referenced applications is incorporated by reference herein.

FIELD

The present technology relates to computer-implemented methods and systems for document processing in general and specifically to a method and an apparatus for determining a document type of a digital document.

BACKGROUND

Determining a type of a digital document, a process also sometimes called a "classification" of a digital document, is a process of assigning one of a number of predefined document types or "classes" to an unknown document. Typical prior art solutions for determining digital document types are based either on pattern recognition techniques or are done using machine learning algorithms (e.g., supervised machine learning algorithms, semi-supervised machine learning algorithms, and the like).

As is known in the art, a machine learning algorithm (or "MLA" for short) is "trained" using a labelled training data set. In order to train the MLA to determine the document type of a digital document, the MLA (during the training phase) is provided with a substantially large number of labelled training objects—each training object containing a digital document with an assigned label indicative of the correct document type. Within supervised or semi-supervised implementations of MLAs, the assigned label is typically created by "assessors"-individuals who manually review training digital documents and assign labels thereto using their professional judgement.

During the training phase, the MLA identifies certain document features of each of the training documents (exact features depend on the execution of the MLA and/or the type of the training documents) and correlates the so-identified document features to the assigned label. By observing a large number of such training objects, the MLA "learns" patterns/hidden relationships between the identified document features and the document type.

The kinds of document features identified during training of the MLA (and, thus, the kinds of document features used by the MLA, once trained, for determining the document type of an unknown document) vary greatly. Some examples of document features that may be identified include (in an example of a digital document containing text): word frequency features, layout features, run-length histograms, and the like.

Once the MLA is trained (and validated using a validation subset of training objects), the MLA is used for classifying an unknown document. By analyzing the unknown document's document features, the MLA uses its trained MLA formula to identify the document type of the unknown document.

It is generally known in the art, that there exists a trade-off between the "cost" of extracting a given document feature and its accuracy vis-a-vis determining the document type of the digital document. Within the technical field of document processing, the "cost" of feature extraction can include computational costs (i.e. processing resources required to extract and/or process such document features), time required to extract and/or process such document features or monetary costs (such as license fees or the like for Optical Character Recognition (OCR) software or other processing software).

OCR, for example, which can be used to identify the words in a sample (such as, for example, in the context of an unknown document to be processed) to enable computation of word frequency or other textual features, can be both computationally and financially costly. The computational cost of performing OCR on a single document page can be from a few hundred milliseconds to a few seconds, depending on the number of words/characters on the page, as well as on the quality of the document. Thus, for a system that processes numerous documents, the toll on processing resources increases significantly as the number of documents increases.

SUMMARY

It is an object of the present technology to ameliorate at least some of the inconveniences present in the prior art.

Embodiments of the present technology have been developed based on the inventors' appreciation that there exists at least one technical problem within the prior art. Without wishing to be bound by any specific theory, the inventors believe that existing MLAs used for classifying digital documents (i.e. for determining a document type of an unknown digital document) use, during the in-use phase of determining the document type of the unknown digital document, an entirety of document features that have been identified during the training phase of the MLA.

More specifically, the inventors theorize that during the training phase of the MLA, the MLA receives training objects and identifies a large number of document features associated with the training digital documents of the training objects. The MLA, during the training phase, identifies significant document features (i.e. those document features that are determinative of the document type) and these significant document features are used in training the MLA and in determining the various hidden associations between document features and the document type.

The MLA typically stores these significant document features in a database, along with their associated values or a range of values. When the MLA is used to determine the document type of the unknown digital document, the MLA uses all of these document features and calculates all significant document features of the unknown digital document being processed to determine the document type thereof Inventors of the present technology believe that such approach to using the MLA for determining document type is tolling on computer processing resources, can be relatively time consuming and can require significant computer storage resources.

Broadly speaking, embodiments of the present technology address at least some of the above identified issues by providing a method and a system for executing the method, the method for determining a document type of an unknown digital document using a plurality of MLA classifiers, the MLA classifiers being associated with a hierarchical order of execution. Each specific MLA classifier is based on a minimum set of document features specifically assigned to that specific MLA classifier. If a specific MLA classifier determines the document type to a pre-determined level of confidence, the document type prediction output by that specific MLA classifier is assigned to the unknown digital document and the remainder of the MLA classifiers are not executed (thus avoiding the need to further process the unknown digital document).

Broadly speaking, each next MLA classifier (i.e. an MLA classifier associated with an immediately following placement in the hierarchical order of execution) uses comparatively "heavier" document features (compared to the MLA classifier(s) having a placement(s) that is (are) immediately previous in the hierarchical order of execution). In embodiments of the present technology, "heavier" refers to those document features requiring more processing resources to obtain (extract from the digital document) and/or to process. Thus, the present inventors believe that at least some embodiments of the present technology allow determining the document type of the unknown digital document by using relatively less computer processing power/resources; by relatively reducing processing time for at least some of the unknown digital documents (such as those digital documents for which a document type can be confidently identified with MLA classifiers associated with an earlier placement in the order of execution).

Some aspects of the present technology include, during the training phase of each of the MLA classifiers, determining which document types are best determined by which MLA classifier of the plurality of MLA classifiers (i.e. which document types are best determined by a given MLA classifier with a confidence level above a pre-determined threshold). Once a given document type is associated with a particular MLA classifier (of an earlier placement in the hierarchical order of execution), training objects having training digital documents of the given document type are not used for training other MLA classifiers (i.e. MLA classifiers of later placement in the hierarchical order of execution). Put another way, MLA classifiers of the plurality of MLA classifiers are independently trained. Additionally, in some embodiments, document features used for training a specific MLA classifier of the plurality of MLA classifiers are not used for training others of the plurality of MLA classifiers.

Additionally, in some embodiments, during the in-use phase of the MLA classifiers, when the MLA classifiers are used to determine a document type associated with an unknown digital document, the MLA classifiers are executed sequentially, according to their placement in the hierarchical order of execution, starting with the one with the earliest placement in the hierarchical order of execution (i.e. the MLA classifier that uses "cheapest" features), sequentially through the remainder of the MLA classifiers (each next MLA classifier using progressively "heavier" document features). If a particular MLA classifier determines the document type with a confidence level above a pre-determined threshold, the document type so predicted is assigned to the unknown digital document and the remainder of the MLA classifiers are not executed. In other words, progression to the next MLA classifier (i.e. to the next MLA classifier with a next immediate placement in the hierarchical order of execution) is executed only if a previous MLA classifier(s) can not determine the document type (i.e. the confidence level of outputted document type is below the pre-determined threshold).

In some embodiments, the different document types are associated with different levels of document structuring. Broadly speaking, document types can be identified as: (i) a rigidly-structured document, (ii) a nearly-rigidly-structured document, (iii) a semi-structured document, and (iv) an un-structured document.

In order to determine the document type, embodiments of the present technology include executing one or more MLA classifiers of the plurality of MLA classifiers, the plurality of MLA classifiers being configured for selective execution, in sequence, according to a hierarchical order of execution. Execution of each MLA classifier can be thought of as a "stage" in a multi-staged (or cascade) process of determining a document type. Each of the MLA classifiers is trained to identify a particular document type using a particular set of document features. Thus, for digital documents of a particular document type, it may be enough to process the digital document with a single MLA classifier (i.e. the MLA classifier associated with an earlier placement in the hierarchical order of execution). For digital documents of other document types it may be required to execute a sub-set or even all of the MLA classifiers in order to determine the document type with a sufficient degree of confidence.

In some embodiments, the various MLA classifiers can be implemented as follows. The various MLA classifiers presented below are organized in: (i) accordance with their placement in the hierarchical order of execution and, (ii) in an ascending order of complexity of document features used by the specific MLA classifier.

First MLA classifier (can be executed as a raster-based classifier): a classifier for determining document type using image-based features.

Second MLA classifier (can be executed as a logotype based classifier): a classifier for determining document type using logotype based image features (i.e. image based features of the logo used in a header of the digital document or image based features associated with a leading portion of the digital document used in lieu of logo).

Third MLA classifier (can be executed as a rule-based classifier): a classifier for determining document type using text-based features that require processing of at least a portion of the content of the digital document.

Fourth MLA (can be executed as a text-based classifier): a classifier for determining document type using text-based feature of an entirety or substantially an entirety of the content of the digital document.

The first MLA classifier and the second MLA classifier use relatively "cheap" document features (i.e. those document features not requiring significant computational resources)—these can be, but are not limited to, image-based features (such as: image size, total number of black pixels, distribution of black pixels, and the like). The third MLA classifier and the fourth MLA classifier use progressively "heavier" features (i.e. those requiring relatively more computational resources)—these can be text-based features (such as: occurrence of a given significant word, frequency of the given significant word, etc.).

Since the first MLA classifier, the second MLA classifier, the third MLA classifier, and the fourth MLA classifier (i.e. MLA classifiers associated with sequential placement in the hierarchical order of execution) use progressively heavier document features, it can be said that the first MLA classifier, the second MLA classifier, the third MLA classifier, and the fourth MLA classifier (i.e. MLA classifiers associated with sequential placement in the hierarchical order of execution) are associated with progressively decreasing speed of outputting the document type.

Thus, embodiments of the present technology identify, for each document type, a minimum set of document features needed for a specific MLA classifier to identify the document type with a confidence level above a pre-determined confidence threshold. The present inventors believe that a technical effect of embodiments of the present technology is achieved at least partially, due to selective-sequential use of multiple MLA classifiers with increasing degree of computational complexity. Thus, over a plurality of unknown digital document to be processed, the present inventors believe that the overall computational resources required to determine the document types of these digital documents will be relatively lower (with most of the benefit stemming from those unknown digital documents processed by MLA classifiers of earlier placement in the hierarchical order of execution and, thus, of lower computational complexity).

In accordance with a first broad aspect of the present technology, there is provided a method of determining a document type associated with a digital document. The method is executable by an electronic device, the electronic device including: a digital document interface for acquiring the digital document to be processed; a data storage device; a processor coupled to the digital document interface and to the data storage device, the processor being configured to execute a plurality of machine learning algorithm (MLA) classifiers, each of the plurality of MLA classifiers having been trained to identify a respective document type; the data storage device being configured to store processing data for the plurality of MLA classifiers and an indication of a hierarchical order of execution of the plurality of MLA classifiers. The method comprises: acquiring, via the digital document interface, the digital document to be processed; executing, by the processor, a first MLA classifier of the plurality of MLA classifiers in an attempt to determine the document type for the digital document, the first MLA classifier being associated with an earliest placement in the hierarchical order of execution; determining, by the processor, if the determined document type outputted by the first MLA classifier is one of first MLA classifier confidently predictable document types; in response to the determined document type outputted by the first MLA classifier being one of first MLA classifier confidently predictable document types: assigning, by the processor, the document type outputted by the first MLA classifier to the digital document; in response to the determined document type outputted by the first MLA classifier not being one of first MLA classifier confidently predictable document types: executing, by the processor, a second MLA classifier of the plurality of MLA classifiers in an attempt to determine the document type for the digital document, the second MLA classifier being associated with a placement in the hierarchical order of execution immediately following that of the first MLA classifier.

In some implementations of the method, the method further comprises: in response to the determined document type outputted by the first MLA classifier being one of first MLA classifier confidently predictable document types, not executing any other ones of the plurality of MLA classifiers.

In some implementations of the method, the method further comprises: in response to the determined document type outputted by the first MLA classifier not being one of first MLA classifier confidently predictable document types: determining, by the processor, if the determined document type outputted by the second MLA classifier is one of second MLA classifier confidently predictable document types; in response to the determined document type outputted by the second MLA classifier being one of second MLA classifier confidently predictable document types: assigning the document type outputted by the second MLA classifier to the digital document; in response to the determined document type outputted by the second MLA classifier not being one of second MLA classifier confidently predictable document types: executing, by the processor, a third MLA classifier of the plurality of MLA classifiers in an attempt to determine the document type for the digital document, the third MLA classifier being associated with a placement in the hierarchical order of execution immediately following that of the second MLA classifier.

In some implementations of the method, the method further comprises: in response to the determined document type outputted by the second MLA classifier being one of second MLA classifier confidently predictable document types, not executing any other ones of the plurality of MLA classifiers.

In some implementations of the method, the plurality of MLA classifiers includes: a first MLA classifier; a second MLA classifier; a third MLA classifier, and a fourth MLA classifier.

In some implementations of the method, each of the first MLA classifier, the second MLA classifier, the third MLA classifier, and the fourth MLA classifier has been independently trained.

In some implementations of the method, the first MLA classifier has been trained on a first set of training objects, the second MLA classifier has been trained on a second set of training objects, the third MLA classifier has been trained on a third set of training objects; and the fourth MLA has been trained on a fourth set of training objects.

In some implementations of the method, the second set of training objects does not include at least some document features of the first set of training objects; the third set of training objects does not include at least some document features of the first set of training objects and the second set of training objects; and the fourth set of training objects does not include at least some document features of the first set of training objects, the second set of training objects and the third set of training objects.

In some implementations of the method, the first MLA classifier is a raster-based classifier.

In some implementations of the method, the second MLA classifier is a logotype-based classifier.

In some implementations of the method, the third MLA classifier is a rule-based classifier.

In some implementations of the method, the third MLA classifier is further configured to execute an OCR function on at least a pre-determined portion of the digital document.

In some implementations of the method, the fourth MLA classifier is a text-based classifier.

In some implementations of the method, the fourth MLA classifier is further configured to execute an OCR function on substantially an entirety of the digital document.

In some implementations of the method, the document type is selected from one of: a rigidly-structured document, a nearly-rigidly-structured document, a semi-structured document, and an un-structured document.

In some implementations of the method, the method further comprises, based on the document type, executing a computer-executable action with respect to the digital document.

In some implementations of the method, the outputted document type by a given one of the plurality of MLA classifiers is a hypothesis for the document type with a confidence parameter which (i) is above a first pre-determined threshold and (ii) has a difference between the confidence parameter and a next-document-type hypothesis confidence parameter that is above a second pre-determined threshold.

In some implementations of the method, the method further comprises, prior to the acquiring, training the plurality of MLA classifiers.

In some implementations of the method, the method further comprises, as part of the training, storing an indication of a respective document type of digital documents that a given one of the plurality of MLA classifiers is trained to confidently predict, as an indication of a given MLA classifier confidently predictable document type.

In some implementations of the method, the method further comprises, as part of the training, determining a confidence parameter associated with an output of a given one of the plurality of MLA classifiers.

In some implementations of the method, the method further comprises, as part of the training, analyzing the confidence parameter for a given document type and a given MLA classifier, and in response to one of: (i) the confidence parameter being below a first pre-determined threshold and (ii) a difference between the confidence parameter and a next-document-type hypothesis confidence parameter being below a second pre-determined threshold, determining that the given document type can not be outputted by the given MLA classifier.

In some implementations of the method, the method further comprises, as part of the training, analyzing the confidence parameter for a given document type hypothesis and a given MLA classifier, and in response to both: (i) the confidence parameter being above a first pre-determined threshold and (ii) a difference between the confidence parameter and a next-document-type confidence parameter being above a second pre-determined threshold, determining that the given document type can be outputted by the given MLA classifier.

In some implementations of the method, the method further comprises, as part of the training, based on comparing the outputted document types of validation set of documents of a given MLA classifier with the assigned label for the validation set of documents: determining precision and recall parameters for each indication of document types; comparing precision and recall for each indication of document types with corresponding threshold values of precision and recall parameters; in response to precision and recall parameters for each indication of document types being greater than the corresponding threshold values of precision and recall parameters: storing the indication of document types that a given one of the plurality of MLA classifiers is trained to confidently predict, as the indication of the given MLA classifier confidently predictable document type.

In some implementations of the method, the digital document interface comprises a network interface and wherein the acquiring comprises: receiving the digital document over a communication network.

In some implementations of the method, the digital document interface comprises a scanner, and wherein the acquiring comprises: receiving a scanned version of a paper-based document.

In accordance to another broad aspect of the present technology, there is provided an electronic device. The electronic device comprises: a digital document interface for acquiring a digital document to be processed; a data storage device; a processor coupled to the digital document interface and to the data storage device, the processor being configured to execute a plurality of machine learning algorithm (MLA) classifiers, each of the plurality of MLA classifiers having been trained to identify a respective document type; the data storage device being configured to store processing data for the plurality of MLA classifiers and an indication of a hierarchical order of execution of the plurality of MLA classifiers; the processor configured to: acquire, via the digital document interface, the digital document to be processed; execute a first MLA classifier of the plurality of MLA classifiers in an attempt to determine the document type for the digital document, the first MLA classifier being associated with an earliest placement in the hierarchical order of execution; determine, by the processor, if the determined document type outputted by the first MLA classifier is one of first MLA classifier confidently predictable document types; in response to the determined document type outputted by the first MLA classifier being one of first MLA classifier confidently predictable document types: assign, by the processor, the document type outputted by the first MLA classifier to the digital document; in response to the determined document type outputted by the first MLA classifier not being one of first MLA classifier confidently predictable document types: execute, by the processor, a second MLA classifier of the plurality of MLA classifiers in an attempt to determine the document type for the digital document, the second MLA classifier being associated with a placement in the hierarchical order of execution immediately following that of the first MLA classifier.

In some implementations of the electronic device, the processor is further configured: in response to the determined document type outputted by the first MLA classifier being one of first MLA classifier confidently predictable document types, not to execute any other ones of the plurality of MLA classifiers.

In some implementations of the electronic device, the processor is further configured: in response to the determined document type outputted by the first MLA classifier not being one of first MLA classifier confidently predictable document types: determine if the determined document type outputted by the second MLA classifier is one of second MLA classifier confidently predictable document types; in response to the determined document type outputted by the second MLA classifier being one of second MLA classifier confidently predictable document types: to assign the document type outputted by the second MLA classifier to the digital document; in response to the determined document type outputted by the second MLA classifier not being one of second MLA classifier confidently predictable document types: to execute a third MLA classifier of the plurality of MLA classifiers in an attempt to determine the document type for the digital document, the third MLA classifier being associated with a placement in the hierarchical order of execution immediately following that of the second MLA classifier.

In some implementations of the electronic device, the processor is further configured: in response to the determined document type outputted by the second MLA classifier being one of second MLA classifier confidently predictable document types, not to execute any other ones of the plurality of MLA classifiers.

In some implementations of the electronic device, the plurality of MLA classifiers includes: a first MLA classifier; a second MLA classifier; a third MLA classifier, and a fourth MLA classifier.

In some implementations of the electronic device, each of the first MLA classifier, the second MLA classifier, the third MLA classifier, and the fourth MLA classifier has been independently trained.

In some implementations of the electronic device, the first MLA classifier has been trained on a first set of training objects, the second MLA classifier has been trained on a second set of training objects, the third MLA classifier has been trained on a third set of training objects; and the fourth MLA has been trained on a fourth set of training objects.

In some implementations of the electronic device, the second set of training objects does not include at least some document features of the first set of training objects; the third set of training objects does not include at least some document features of the first set of training objects and the second set of training objects; and the fourth set of training objects does not include at least some document features of the first set of training objects, the second set of training objects and the third set of training objects.

In some implementations of the electronic device, the first MLA classifier is a raster-based classifier.

In some implementations of the electronic device, the second MLA classifier is a logotype-based classifier.

In some implementations of the electronic device, the third MLA classifier is a rule-based classifier.

In some implementations of the electronic device, the third MLA classifier is further configured to execute an OCR function on at least a pre-determined portion of the digital document.

In some implementations of the electronic device, the fourth MLA classifier is a text-based classifier.

In some implementations of the electronic device, the fourth MLA classifier is further configured to execute an OCR function on substantially an entirety of the digital document.

In some implementations of the electronic device, the document type is selected from one of: a rigidly-structured document, a nearly-rigidly-structured document, a semi-structured document, and an un-structured document.

In some implementations of the electronic device, the processor is further configured, based on the document type, to execute a computer-executable action with respect to the digital document.

In some implementations of the electronic device, the outputted document type by a given one of the plurality of MLA classifiers is a hypothesis for the document type with a confidence parameter which (i) is above a first pre-determined threshold and (ii) has a difference between the confidence parameter and a next-document-type hypothesis confidence parameter that is above a second pre-determined threshold.

In some implementations of the electronic device, the processor is further configured, as part of the training, to determine a confidence parameter associated with an output of a given one of the plurality of MLA classifiers.

In some implementations of the electronic device, the processor is further configured, as part of the training, to analyze the confidence parameter for a given document type and a given MLA classifier, and in response to one of: (i) the confidence parameter being below a first pre-determined threshold and (ii) a difference between the confidence parameter and a next-document-type confidence parameter being below a second pre-determined threshold, to determine that the given document type can not be confidently outputted by the given MLA classifier.

In some implementations of the electronic device, the processor is further configured, as part of the training, to analyze the confidence parameter for a given document type and a given MLA classifier, and in response to both of: (i) the confidence parameter being below a first pre-determined threshold and (ii) a difference between the confidence parameter and a next-document-type confidence parameter being below a second pre-determined threshold, to determine that the given document type can be confidently outputted by the given MLA classifier.

In some implementations of the electronic device, the processor is further configured, as part of the training, based on comparing the outputted document types of validation set of documents of a given MLA classifier with the assigned label for the validation set of documents: to determine precision and recall parameters for each indication of document types; to compare precision and recall for each indication of document types with corresponding threshold values of precision and recall parameters; in response to precision and recall parameters for each indication of document types being greater than the corresponding threshold values of precision and recall parameters: to store the indication of document types that a given one of the plurality of MLA classifiers is trained to confidently predict, as the indication of the given MLA classifier confidently predictable document type.

In some implementations of the electronic device, the digital document interface comprises a network interface and wherein to acquire the digital document to be processed, the processor is configured to receive the digital document over a communication network.

In some implementations of the electronic device, the digital document interface comprises a scanner, and wherein to acquire the digital document to be processed, the processor is configured to receive a scanned version of a paper-based document.

In accordance with another broad aspect of the present technology, there is provided a method of training a plurality of MLA classifiers, the plurality of MLA classifiers for determining a document type of an unknown digital document, the method executable by an electronic device associated with the plurality of MLA classifiers. The method comprises: sequentially training a first one of the plurality of MLA classifiers and a second one of the plurality of MLA classifiers, during the sequential training of the first one and the second one of the plurality of MLA classifiers, determining: a first document type confidently identifiable by the first one of the plurality of MLA classifiers; a second document type confidently identifiable by the second one of the plurality of MLA classifiers; and a hierarchical order of execution of the first one and the second one of the plurality of MLA classifiers, the hierarchical order of execution identified such that a respective set of document features used by the second one of the plurality of MLA classifiers is comparatively heavier than a respective set of features used by the first one of the plurality of MLA classifiers.

In some implementations of the method, the first document type is a plurality of first document types.

In some implementations of the method, the second document type is a plurality of second document types.

In some implementations of the method, the hierarchical order of execution is further identified such that a respective speed of operation of the second one of the plurality of MLA classifiers is comparatively lower than the first one of the plurality of MLA classifiers.

In some implementations of the method, the sequentially training a given one of the first one of the plurality of MLA classifiers and the second one of the plurality of MLA classifiers comprises: receiving an indication of at least some of: document types, features, and MLA types to be used; receiving a plurality of training digital documents; training of the given one of the first one of the plurality of MLA classifiers and the second one of the plurality of MLA classifiers using the plurality of training digital documents; validating of the given one of the first one of the plurality of MLA classifiers and the second one of the plurality of MLA classifiers; determining which document types given one of the first one of the plurality of MLA classifiers and the second one of the plurality of MLA classifiers confidently predicts; training the other one given one of the plurality of MLA classifiers and the second one of the plurality of MLA classifiers.

In some implementations of the method, the determining which document types given one of the first one of the plurality of MLA classifiers and the second one of the plurality of MLA classifiers confidently predicts is executed as part of the validating.

In accordance with yet another broad aspect of the present technology, there is provided a non-transient computer readable medium containing program instructions for causing an electronic device to perform the method of: accessing a plurality of machine learning algorithm (MLA) classifiers, each of the plurality of MLA classifiers having been trained to identify a respective document type; the plurality of MLA classifiers associated with a hierarchical order of execution of the plurality of MLA classifiers; acquiring, via the digital document interface, the digital document to be processed; executing, by the processor, a first MLA classifier of the plurality of MLA classifiers in an attempt to determine the document type for the digital document, the first MLA classifier being associated with an earliest placement in the hierarchical order of execution; determining, by the processor, if the determined document type outputted by the first MLA classifier is one of first MLA classifier confidently predictable document types; in response to the determined document type outputted by the first MLA classifier being one of first MLA classifier confidently predictable document types: assigning, by the processor, the document type outputted by the first MLA classifier to the digital document; in response to the determined document type outputted by the first MLA classifier not being one of first MLA classifier confidently predictable document types: executing, by the processor, a second MLA classifier of the plurality of MLA classifiers in an attempt to determine the document type for the digital document, the second MLA classifier being associated with a placement in the hierarchical order of execution immediately following that of the first MLA classifier.

In the context of the present specification, a "server" is a computer program that is running on appropriate hardware and is capable of receiving requests (e.g., from electronic devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" (or a "client device") is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways.

It should be noted that a device acting as an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "computer readable information storage medium" (or a "data storage device") is intended to include media of any nature and kind whatsoever, including RAM, ROM, disks (CD-ROMs, DVDs, floppy disks, hard drivers, etc.), USB keys, solid state-drives, tape drives, etc.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
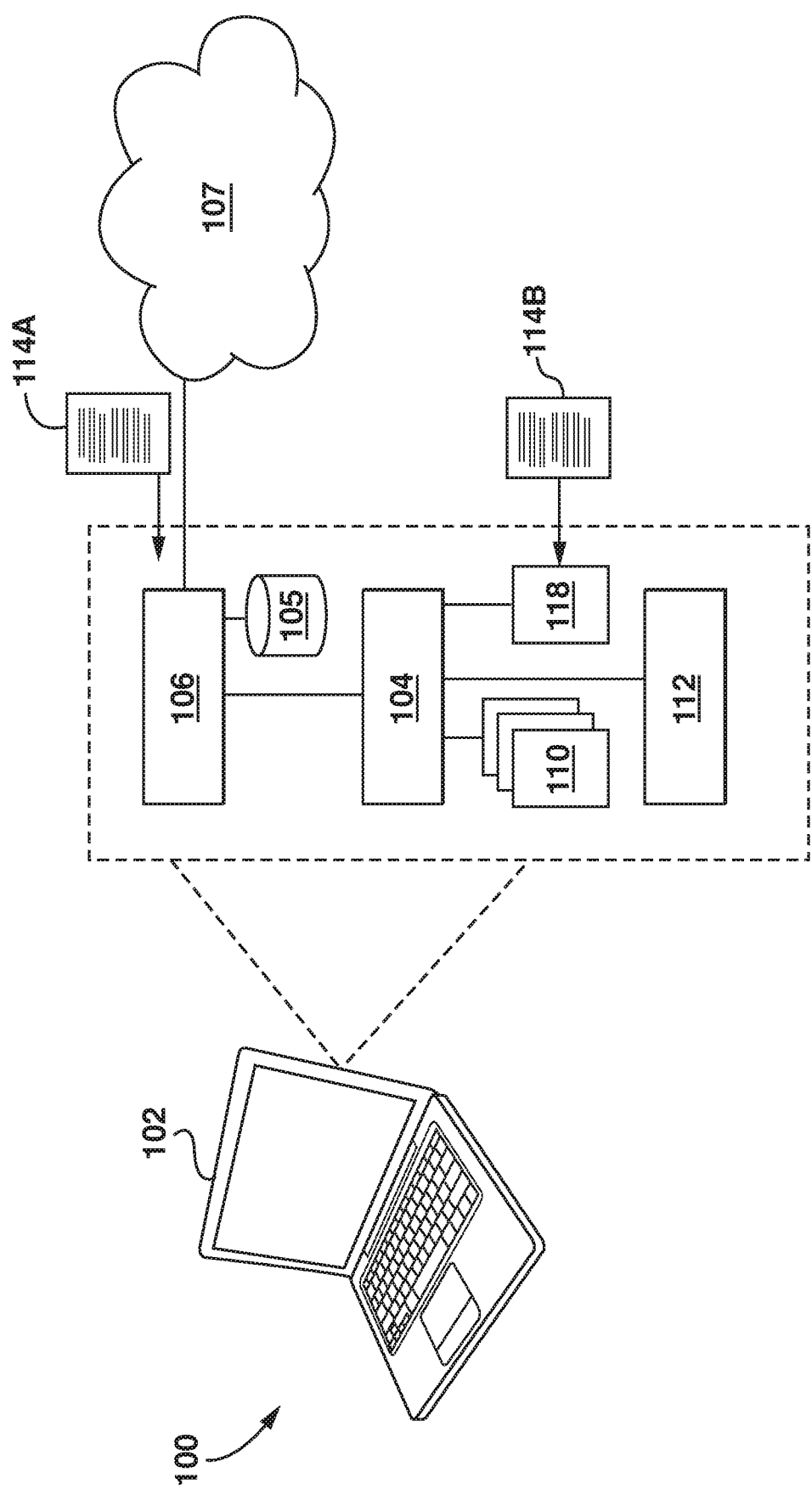
FIG. 1 depicts a system suitable for implementing non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The system 100 comprises an electronic device 102. The implementation of the electronic device 102 is not particularly limited, but as an example, the electronic device 102 may be implemented as a personal computer (desktops, laptops, netbooks, etc.), a wireless communication device (such as a smartphone, a cell phone, a tablet and the like), as well as network equipment (such as routers, switches, and gateways). As schematically depicted in FIG. 1, the electronic device 102 comprises a processor 104, a data storage device 105, a digital document reader 118, a network interface 106, and a plurality of other components 112.

The processor 104 may comprise one or more processors and/or one or more microcontrollers configured to execute instructions and to carry out operations associated with the operation of the electronic device 102. In various embodiments, the processor 104 may be implemented as a single-chip, multiple chips and/or other electrical components including one or more integrated circuits and printed circuit boards. The processor 104 may optionally contain a cache memory unit (not depicted) for temporary local storage of instructions, data, or computer addresses. By way of example, the processor 104 may include one or more processors or one or more controllers dedicated for certain processing tasks of the electronic device 102 or a single multi-functional processor or controller.

The data storage device 105 may encompass one or more storage media and generally provide storage for data, computer code, and the like. By way of example, the data storage device 105 may include various tangible computer-readable storage media including Read-Only Memory (ROM) and/or Random-Access Memory (RAM). The data storage device 105 may also include one or more fixed storage devices in the form of, by way of example, hard disk drives (HDDs), solid-state drives (SSDs), flash-memory cards (e.g., Secured Digital or SD cards, embedded MultiMediaCard or eMMD cards), among other suitable forms of memory coupled bi-directionally to the processor 104.

The data storage device 105 may store inter alia a series of computer-readable instructions, which instructions when executed cause the processor 104 (as well as other components of the electronic device 102) to execute the various operations described herein.

Depending on the implementation of the electronic device 102, the plurality of other components 112 may include additional communication network interfaces (such as wireless network interfaces), various sensors, power source components, batteries, and the like.

In various embodiments of the present technology, various components of electronic device 102 may be operably connected together by one or more buses (including hardware and/or software), the buses not being separately numbered. As an example and not by way of limitation, the one or more buses may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, a Universal Asynchronous Receiver/Transmitter (UART) interface, a Inter-Integrated Circuit ($I^2C$) bus, a Serial Peripheral Interface (SPI) bus, a Secure Digital (SD) memory interface, a MultiMediaCard (MMC) memory interface, a Memory Stick (MS) memory interface, a Secure Digital Input Output (SDIO) interface, a Multi-channel Buffered Serial Port (McBSP) bus, a Universal Serial Bus (USB) bus, a General Purpose Memory Controller (GPMC) bus, a SDRAM Controller (SDRC) bus, a General Purpose Input/Output (GPIO) bus, a Separate Video (S-Video) bus, a Display Serial Interface (DSI) bus, an Advanced Microcontroller Bus Architecture (AMBA) bus, or another suitable bus or a combination of two or more of these.

The network interface 106 (which can be implemented as a network card or the like) is communicatively coupled to a communication network 107 for accessing one or more network nodes coupled thereto (not depicted). In some non-limiting embodiments of the present technology, the communication network 107 can be implemented as the Internet. In other embodiments of the present technology, the communication network 107 can be implemented differently, such as any wide-area communication network, local-area communication network, a private communication network and the like.

A communication link (not separately numbered) between the network interface 106 and the communication network 107 is implemented will depend inter alia on how the electronic device 102 is implemented. Merely as an example and not as a limitation, in those embodiments of the present technology where the electronic device 102 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the electronic device 102 is implemented as a notebook computer, the communication link can be either wireless (such as Wireless Fidelity, or WiFi® for short, Bluetooth® or the like) or wired (such as an Ethernet based connection).

The digital document reader 118 can be implemented as a scanner, a camera or any other capturing device for acquiring a digital version of a paper-based document.

Figure 4:
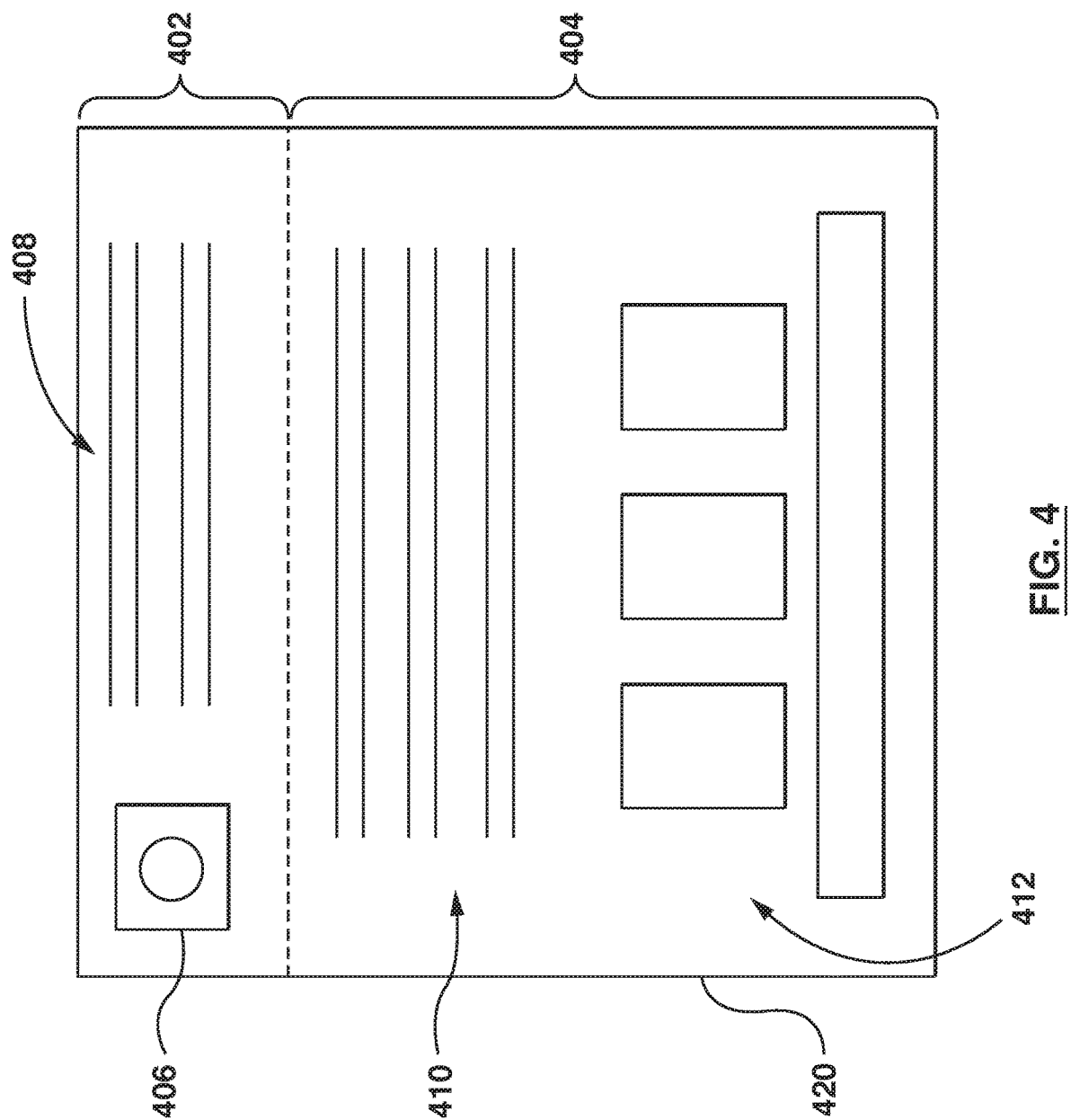
FIG. 4 depicts a schematic representation of an example of content of a digital document (as displayed on a computer screen, for example), the digital document being an example of a training digital document used for training the plurality of MLA classifiers of FIG. 2 or a unknown digital document which is processed by the plurality of MLA classifiers of FIG. 2 after having been trained using the training process, as depicted in FIG. 3.

As will be explained in further detail below, the digital document reader 118 and the network interface 106 are examples of a "digital document interface" to the extent that both are configured to receive a digital document 114A, 114B for processing by the processor 104. A brief reference will now be made to FIG. 4, which depicts a schematic representation 420 of an example of content of the digital document 114A, 114B (as displayed on a computer screen (not numbered), for example). It should be expressly understood that the screenshot 400 is an example only and the digital document 114A, 114B can have different structure, with fewer or more document elements. It is also noted that the example of the digital document 114A, 114B can be representative of both of training digital documents and unknown digital documents to be processed (as will be explained in further detail herein below).

The content can be said to be split into a logotype portion 402 (also sometimes called a "document header") and a main body portion 404. The logotype portion 402 includes an image 406 (which can be a logo or the like) and structured contact information 408. As such, in the depicted embodiment, the logotype portion 402 is a letterhead header that includes the company logo and company contact information. Generally speaking, the logotype portion 402 does not need to be the letterhead header and can be generally considered to be a certain pre-defined header portion of the content, such as but not limited to top ten percent of the page size, top twenty percent of the page size or the like.

The main body portion 404 can include a textual content portion 410 and one or more images 412. Naturally, the main body portion 404 can include a number of additional components, such as: separators (black and white), tables, checkmarks, barcodes, and the like. Additionally, the digital document 114A, 114B can contain multiple pages and some or all pages of the digital document 114A, 114B can have a different structure amongst themselves.

Various elements of the content of the digital document 114A, 114B can be referred to as "image elements".

Figure 2:
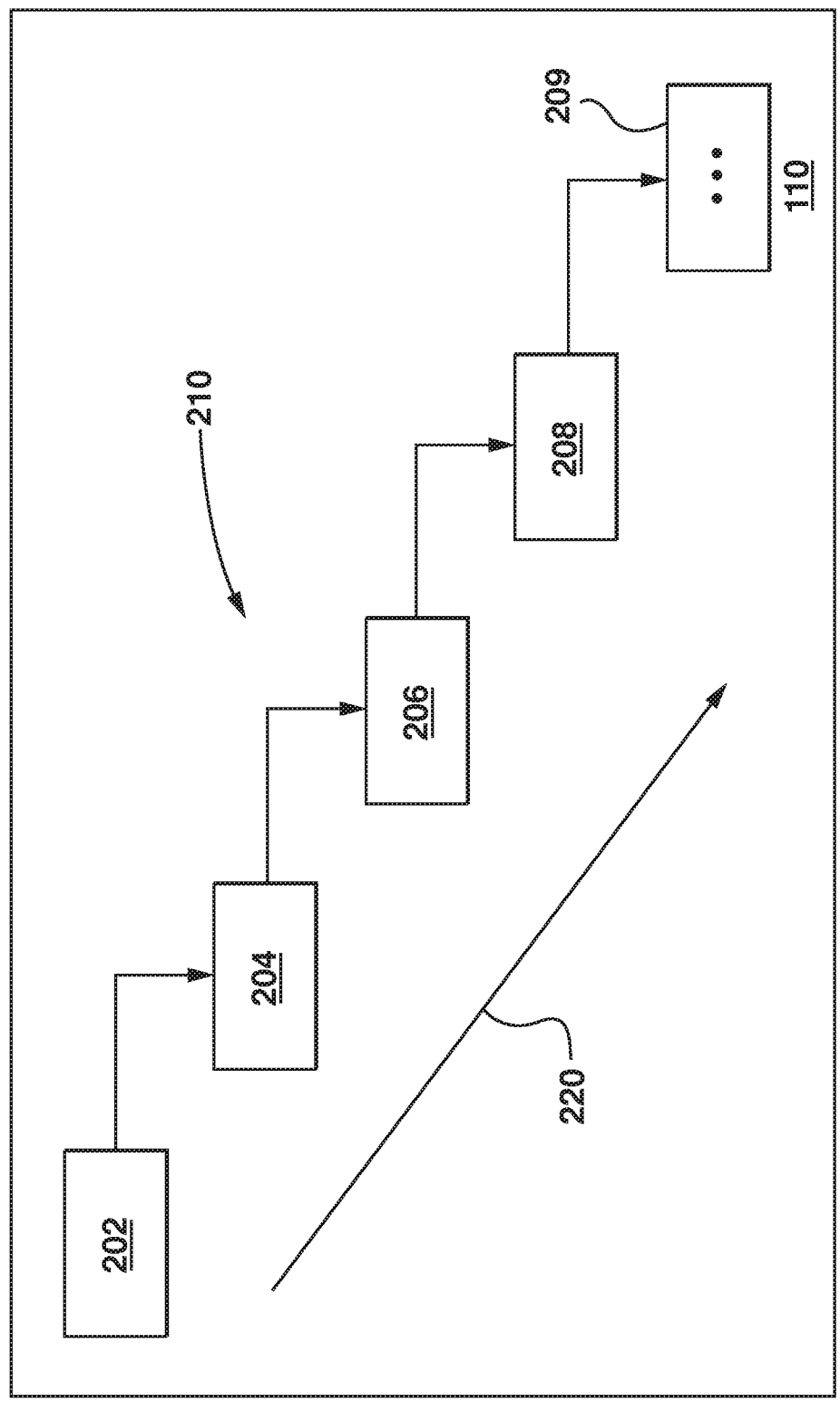
FIG. 2 depicts a schematic representation of a plurality of MLA classifiers executed within the system of FIG. 1, the plurality of MLA classifiers being executed in accordance with non-limiting embodiments of the present technology.

In accordance with non-limiting embodiments of the present technology, the processor 104 is configured to execute a plurality of machine learning algorithm (MLA) classifiers 110. With reference to FIG. 2, there is depicted a schematic representation of the plurality of MLA classifiers 110. The plurality of MLA classifiers 110 includes: a first MLA classifier 202, a second MLA classifier 204, a third MLA classifier 206, a fourth MLA classifier 208, as well as a plurality of additional MLA classifiers jointly depicted at 209.

Each of the first MLA classifier 202, the second MLA classifier 204, the third MLA classifier 206, the fourth MLA classifier 208, and the plurality of additional MLA classifiers 209 can be implemented as a supervised learning or a semi-supervised learning based MLA. As a non-limiting list of examples, each of the first MLA classifier 202, the second MLA classifier 204, the third MLA classifier 206, the fourth MLA classifier 208, and the plurality of additional MLA classifiers 209 can be implemented as:
    Artificial neural network;
    Bayesian statistics;
    Backpropagation;
    Gaussian process regression;
    Decision trees;
    Nearest Neighbor Algorithm;
    Support Vector Machine;
    and the like.

It is noted that a given one of the first MLA classifier 202, the second MLA classifier 204, the third MLA classifier 206, the fourth MLA classifier 208, and the plurality of additional MLA classifiers 209 does not need to be implemented in the same manner as another one (or any other) of the first MLA classifier 202, the second MLA classifier 204, the third MLA classifier 206, the fourth MLA classifier 208, and the plurality of additional MLA classifiers 209. How each one of the first MLA classifier 202, the second MLA classifier 204, the third MLA classifier 206, the fourth MLA classifier 208, and the plurality of additional MLA classifiers 209 are trained, used and validated will be described in greater detail herein below.

The plurality of MLA classifiers 110 is associated with a hierarchical order 210 of execution. In other words, when the plurality of MLA classifiers 110 are executed, the first MLA classifier 202 (associated with an "earliest", which can also be thought of as "highest", placement in the hierarchical order 210 of execution) is executed first. Subject to certain conditions (as will be described below), if the first MLA classifier 202 does not output the document type that is assigned to the digital document 114A, 114B being processed, execution passes to the next MLA classifier associated with the next sequential placement in the hierarchical order 210 of execution (in this example, the second MLA classifier 204), and so on.

The hierarchical order 210 of execution is associated with a direction 220—from the first MLA classifier 202 (with the "earliest" or "highest" placement in the hierarchical order 210 of execution) to the plurality of additional MLA classifiers 209 (with the last one having the "latest" or "lowest" placement in the hierarchical order 210 of execution).

In accordance with the embodiments of the present technology, the plurality of MLA classifiers 110 are organized within the hierarchical order 210 of execution in the direction 220, such that at least some of the following conditions are met (when comparing (i) a specific MLA classifier associated with the immediately following placement in the hierarchical order 210 of execution with (ii) another specific MLA classifier associated with an immediately preceding placement in the hierarchical order 210 of execution):
    Complexity of document features used by each next MLA classifier is progressively more complex (also referred to as "heavier" or "more expensive");
    Processing speed (i.e. document feature extraction and/or processing) decreases;
    Total processing time of the digital document 114A, 114B to determine document type thereof increases;
    The document type confidently predicted becomes less structured.

Operation of the plurality of MLA classifiers 110 can be broadly categorized into a training phase and an in-use phase. The training phase includes a training sub-phase and a validation (re-training) sub-phase.

Training Phase (Training Sub-Phase) of the Plurality of MLA Classifiers 110

Figure 3:
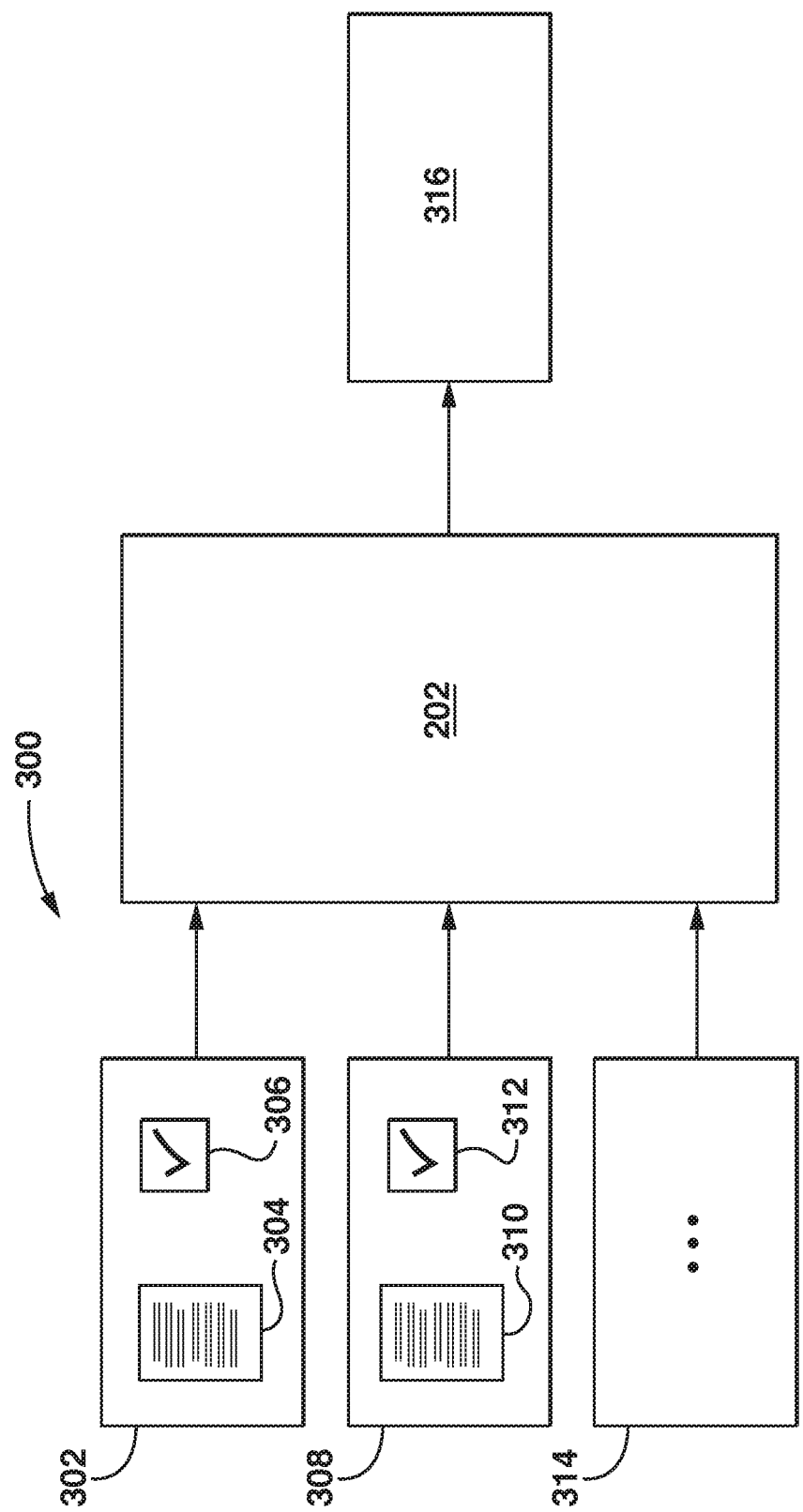
FIG. 3 depicts a schematic representation of a non-limiting embodiment of a training process of the plurality of MLA classifiers of FIG. 2, using an example of a first MLA classifier of the plurality of MLA classifiers.

FIG. 3 depicts a schematic representation of training of the plurality of classifiers 110, using an example of training of the first MLA classifier 202.

Training of the first MLA classifier 202 is executed using a set of training objects 300, including a first training object 302, a second training object 308 and a plurality of additional training objects 314. The number of training objects within the plurality of additional training objects 314 is not particularly limited, but generally includes a number of training objects of different document types to enable training of the first MLA classifier 202. It is believed that a person of ordinary skill in the art will be able to select the required number of training objects 300 to train of the first MLA classifier 202.

The first training object 302 includes a first training digital document 304 and a first assigned label 306. The first assigned label 306 can be inputted by an assessor (not depicted) and represents a document type associated with the first training digital document 304 (based on assessor's perceived value for the document type of the first training digital document 304). The first assigned label 306 is selected from a plurality of possible labels, the plurality of possible labels selected based on which labels the first MLA classifier 202 needs to learn to predict, when trained and in-use.

The second training object 308 includes a second training digital document 310 and a second assigned label 312. The second assigned label 312 can be inputted by the assessor and represents a document type associated with the second training digital document 310. The second assigned label 312 is selected from a plurality of possible labels, the plurality of possible labels selected based on which labels the first MLA classifier 202 needs to learn to predict, when trained and in-use.

In some embodiments of the present technology, the document type of the first training digital document 304 and the second training digital document 310 are the same, therefore the first assigned label 306 and the second assigned label 312 can be the same. In these embodiments, the first training digital document 304 and the second training digital document 310 (being of the same document type) are selected based on what document type the first MLA classifier 202 is being trained to predict. In other embodiments, the document type of the first training digital document 304 and the second training digital document 310 are different, therefore the first assigned label 306 and the second assigned label 312 are different as well. Within the latter embodiments, during the training, the first MLA classifier 202 can determine which ones of the so inputted document types it is more suitable to predict.

As part of the training phase, the MLA classifier 202 generates a MLA formula 316—an algorithm that is used for predicting a target (i.e. the document type) based on document features of the unknown digital document 114A, 114B submitted for processing to the first MLA classifier 202.

Same considerations apply mutatis mutandis to the other training objects of the plurality of additional training objects 314.

Same (or substantially the same) training approach is used for the remainder of the plurality of MLA classifiers 110.

Training Phase (Validation Sub-Phase) of the Plurality of MLA Classifiers 110

Once the first MLA classifier 202 is trained, the validation sub-phase commences. In order to execute the validation sub-phase, the first MLA classifier 202 is presented with a plurality of validation objects. A given validation object can be similar to the first training object 302 and/or the second training object 308 (albeit having content of digital document not yet seen by the first MLA classifier 202).

More specifically, a given validation document is submitted to the first MLA classifier 202. The first MLA classifier 202 using the trained MLA formula 316, analyzes document features of the given validation document and outputs a prediction as to the document type. The outputted prediction is then compared with the assigned label (i.e. ground truth label for the given validation document) for the given validation document and any errors in prediction are fed back into the first MLA classifier 202 for re-training. The validation and re-training processes are repeated until the errors (either number of errors or the margin of error) fall below a pre-determined acceptable error threshold (based on a validation metric).

The type of the validation metric used is not limited and depends on what type of prediction the first MLA classifier 202 is trained to output and what further processing is to be based on such the prediction. Some examples of the validation metric include: precision metric, recall metric, F-measure metric and the like. It is believed that validation metric types are well known to those of ordinary skill in the art and, as such, they will not be described herein at length.

Suffice it to say that in some embodiments, the document type is used for processing digital documents in systems, where a high precision is required (in other words, wrong predictions outputted by the plurality of MLA classifiers 110 should be minimized). Typically, this applies (but is not limited) to systems for fully automatic processing of digital documents. Within these types of systems, if the initial prediction of the document type is incorrect, the entire digital document processing is executed erroneously. As an example, in an automatic system for processing a scanned document, if a scanned invoice was incorrectly classified—it might have been routed to an improper department, creating delays in processing of payment, etc. Hence, for such systems, the validation metric selected is precision metric.

In other embodiments, it may be required to have a high recall level (i.e. there is a need for multiple predictions with a higher tolerance for incorrect prediction). This is typical of but not limited to, those scenarios of digital document processing where the processed document undergoes a verification process, either by an operator or an automatic rule-based verification process. Within these scenarios, it is desirable to output several predictions (albeit with potentially a higher possibility for an erroneous prediction), as the digital document being processed undergoes some sort of the verification process.

For example, in a scenario where the automated digital document processing system is set up to assemble a pre-defined set of documents (let's assume a passport scan and a driver's license scan). Hence, it is apriori known what documents make up the set of documents (hence, a rule-based validation process can be developed). If a first digital document is already positively identified to be a scan of a passport, and a second digital document is associated with two prediction hypothesises (either a passport or a driver's license), the rule-based validation would select driver's license as the document type (making up the set of documents).

Other verification models can also be used, such as cross-validation and the like.

Sequential Training of the Plurality of MLA Classifiers 110

In some embodiments of the present technology, the plurality of MLA classifiers 110 is trained sequentially. If during the training phase of a given one of the plurality of MLA classifiers 110 (i.e. one of the first MLA classifier 202, the second MLA classifier 204, the third MLA classifier 206, the fourth MLA classifier 208, and the plurality of additional MLA classifiers 209), it is determined that a given document type is confidently identified by a faster MLA classifier (i.e. a MLA classifier associated with the "earlier", which can also be thought of "higher", placements of the hierarchical order 210 of execution), then the slower MLA classifiers (i.e. MLA classifiers associated with "later", which can also be thought as "lower", placement in the hierarchical order 210 of execution) are not trained to recognize the given document type (and, therefore, are not trained on the training digital documents 304, 310 of the given document type).

First MLA Classifier 202—Raster Classifier Training

The first MLA classifier 202 (being implemented as a raster classifier) has the highest processing speed amongst the plurality of MLA classifiers 110. The first MLA classifier 202 is generally best suited for digital documents 114A, 114B of a rigid or nearly-rigid document type (such as invoices, forms and the like).

Training of the first MLA classifier 202 is executed as follows. Broadly speaking, training of the first MLA classifier 202 involves the first MLA classifier 202 identifying a number of document features of the training digital documents 304, 310 of different document types, the number of document features that correlate to the particular document type.

Training of the first MLA classifier 202 is executed using scaled-down images of the training digital documents 304, 310 of the set of training objects 300. Additionally and optionally, the training of the first MLA classifier 202 can be executed using image elements extracted from the training digital documents 304, 310 of different document types. The image element data can be extracted during training object pre-processing. In some embodiments of the present technology, the pre-processing includes analyzing a given training object using a connected-component labelling based analysis techniques. More specifically, in some embodiments of the present technology, the first MLA classifier 202 analyzes image elements that are located within a pre-determined proximity to one another, with the image elements each containing their respective plurality of pixels connected in accordance with a pre-defined metric. In some embodiments of the present technology, the pre-defined metric is the same pixel color.

Training of the first MLA classifier 202 is executed using at least one training object containing the training digital documents 304, 310 of each document type for which the first MLA classifier 202 is being trained. The images of the given training digital document 304, 310 are first binarized and then normalized. Some examples of normalizing process include (but are not limited to): automatic detection and deletion of margins (such as white space, space containing scanning artifacts, and the like). The normalized images are augmented with white lines (either left and right, or top and bottom, depending on the image orientation) in order to augment the normalized image to a square form. The given training digital document 304, 310 is then proportionally resized to a pre-determined image size (which depends on the size of an original training document). For example, for the given training digital document 304, 310 of A4 format, the pre-determined image size can be 100×100 pixels. A given training digital document 304, 310 that has been pre-processed is referred to as pre-processed training digital document 304, 310.

A greyscale version of a "merged" training digital document 304, 310 can then be generated in the following manner. Several pre-processed training digital document 304, 310 of the given document type are superimposed with each other to create the merged training digital document 304, 310. An average number of black pixels for each pixel location of the merged training digital document 304, 310 is determined.

In certain embodiments of the present technology, additionally and optionally, the first MLA classifier 202 further analyzes, for each given training digital document 304, 310, if the given training digital document 304, 310 contains image elements of given types (textual elements, dividers, barcodes, embedded images, etc.). In some embodiments of the present technology, if the first MLA classifier 202 determines that certain image elements are present within the training digital documents 304, 310 of a certain document type but not of the other document type, such image elements are added as a feature to the training of the first MLA classifier 202.

The validation sub-phase of the training phase of the first MLA classifier 202 determines if a sufficient number of document features for each document type has been determined (i.e. a sufficient number of document features to define the MLA formula 316). In some embodiments of the present technology, the first MLA classifier 202 may determine, as part of training and validation, that certain document types can be identified with an acceptable level of confidence using the features of the merged training digital document 304, 310 as a whole, rather than document features of individual object elements. The first MLA classifier 202 can store an indication thereof in the data storage device 105.

Figure 5:
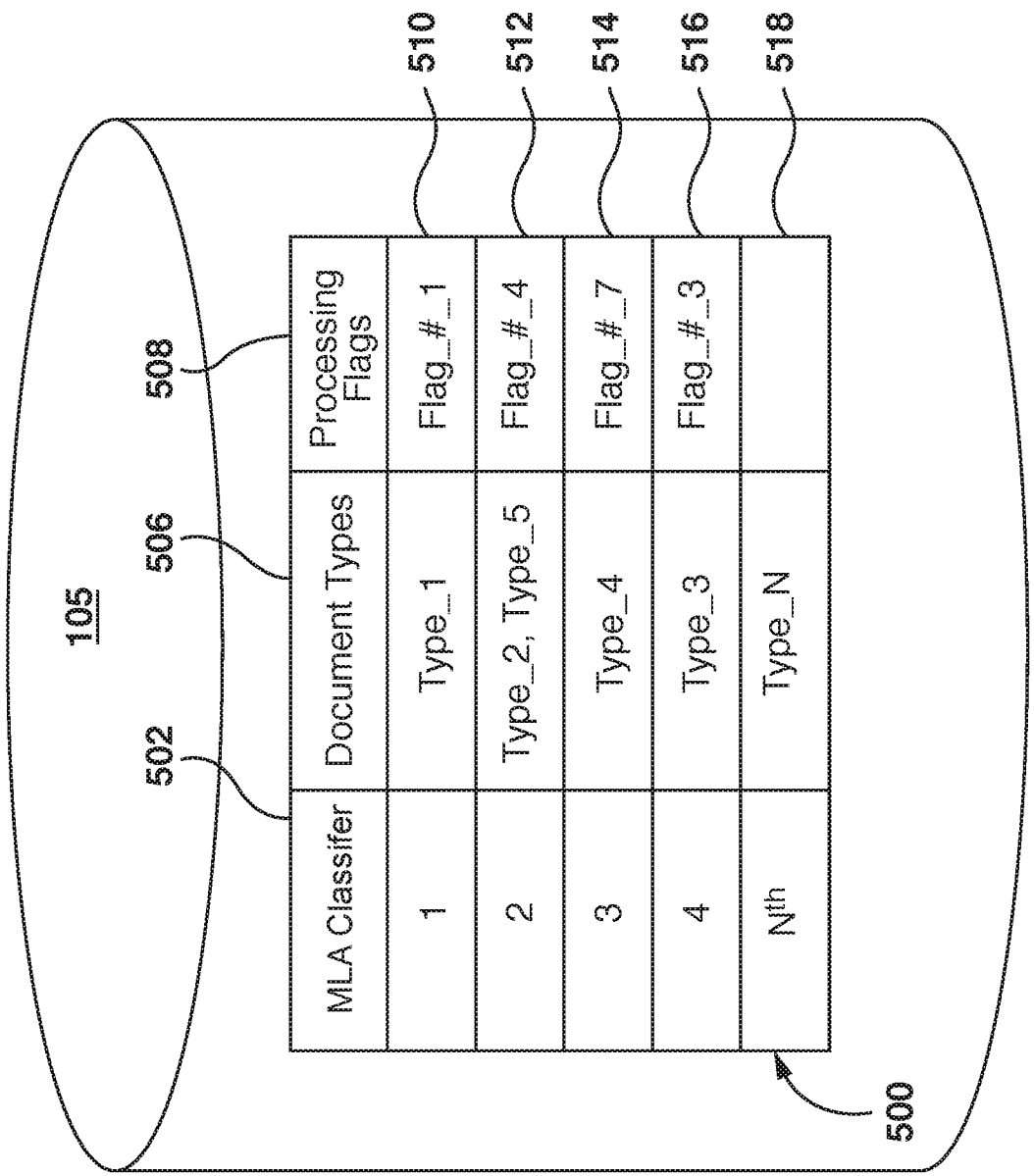
FIG. 5 depicts a document type determination matrix maintained within a data storage device of the system of FIG. 1, the document type determination matrix having been populated during non-limiting embodiments of the training process of FIG. 3.

More specifically, as part of training the first MLA classifier 202 (as well as other MLA classifiers of the plurality of MLA classifiers 110), a document type determination matrix 500 (FIG. 5) can be maintained within the data storage device 105. With brief reference to FIG. 5, which depicts a non-limiting example of the document type determination matrix 500 maintained within the data storage device 105, the document type determination matrix 500 maintains a mapping between an indication 502 of a given MLA classifier, an indication of document type(s) that the given MLA classifier 202, 204, 206, 208, 209 identifies with a confidence level above a pre-determine confidence threshold and, optionally, an indication of one or more processing flags 508.

The document type determination matrix 500 maintains a number of records, such as a first record 510, a second record 512, a third record 514, a fourth record 516, and a fifth record 518. Each of the first record 510, the second record 512, the third record 514, the fourth record 516, and the fifth record 518 are respectively associated with the first MLA classifier 202, the second MLA classifier 204, the third MLA classifier 206, the fourth MLA classifier 208, and the plurality of additional MLA classifiers 209.

In some embodiments of the present technology, the pre-determined confidence level is determined based on the required accuracy of a document type prediction to be outputted by the plurality of MLA classifiers 110. In accordance with embodiments of the present technology, each of the first MLA classifier 202, the second MLA classifier 204, the third MLA classifier 206, the fourth MLA classifier 208, and the plurality of additional MLA classifiers 209 is trained to determine its respective one or more document types and, as such, an indication of the document types 506 for each of the first MLA classifier 202, the second MLA classifier 204, the third MLA classifier 206, the fourth MLA classifier 208, and the plurality of additional MLA classifiers 209 can be different. However, in alternative embodiments, there can be an overlap in the document types of digital documents confidently determined by some or all of the first MLA classifier 202, the second MLA classifier 204, the third MLA classifier 206, the fourth MLA classifier 208, and the plurality of additional MLA classifiers 209.

Continuing with the description of the training of the first MLA classifier 202, the first MLA classifier 202 populates its respective first record 510 with an indication of which document types the first MLA classifier 202 is trained to confidently identify 506 (in the depicted embodiment: "Type_1"), as well as any processing flags 508. For example, should it be determined that certain document types identified by the first MLA classifier 202 can be confidently identified without analysis of image elements, a processing flag to that extent can be stored within the indication of processing flags 508 (in the depicted embodiments "Flag_#_1"). The indication of processing flags 508 can also store an indication of the size of the training digital documents 304, 310 that were used for training the first MLA classifier 202, for example.

Once the first MLA classifier 202 is trained, in the in-use phase of the first MLA classifier 202, when the plurality of MLA classifiers 110 are used for identifying a document type of an unknown digital document 114A, 114B; if the first MLA classifier 202 determines that the unknown digital document 114A, 114B is of the document type for which the indication is stored within the indication of document types 506 (i.e. "Type_1" in this example), the outputted prediction of the first MLA classifier 202 is assigned as the document type to the unknown digital document 114A, 114B. Furthermore, in accordance with some embodiments of the present technology, other MLA classifiers of the plurality of MLA classifiers 110 are not executed for the unknown digital document 114A, 114B.

In accordance with embodiments of the present technology, the first MLA classifier 202 is associated with the earliest (or "highest") placement in the hierarchical order 210 of execution. In other words, when an unknown digital document 114A, 114B is received for processing by the plurality of MLA classifiers 110, the first MLA classifier 202 will be executed first in an attempt to determine the document type of the unknown digital document 114A, 114B.

Second MLA Classifier 204—Logotype Classifier Training

The second MLA classifier 204 (being implemented as a logotype classifier) has a placement in the hierarchical order 210 of execution immediately following that of the first MLA classifier 202 (in other words, its placement is "lower" than that of the first MLA classifier 202). It is noted that the second MLA classifier 204 has a processing time which is relatively higher than that of the first MLA classifier 202. The second MLA classifier 204, generally speaking, is more applicable to identifying those document types that have varying layouts within a given document type. Typically, the second MLA classifier 204 confidently identifies the digital documents 114A, 114B of the document type that have common image elements, such as company logos, other elements of letterhead header, and the like. Typically, such document types are not confidently identified using the first MLA classifier 202 (of the raster image classifier type) and, thus require, processing by the second MLA classifier 204.

It should be noted that document features analyzed by the second MLA classifier 204 are not limited to traditional "logos" (i.e. a thumbnail or another image identifying a company). Rather, the second MLA classifier 204 is configured to process document features associated with digital documents 114A, 114B that may not contain a logo per se. As such, the second MLA classifier 204 is configured to analyze any type of a structured header of the digital documents 114A,114B.

In some embodiments, the structured header is identified as a pre-determined portion of the content of a first page (or any other page of a multi-page digital document 114A, 114B) of the digital documents 114A, 114B. As a non-limiting example, the pre-determined portion of the content can be the top quarter of the first page of the digital documents 114A, 114B. The exact size of the pre-determined portion is determined by the second MLA classifier 204 by analyzing a plurality of training digital documents 304, 310 to determine which portion of the training digital documents 304, 310 of a given document type have the logotype portion 402 with substantially constant layout (while the main body portion 404 (layout, structure, etc.) is at least partially different between various training digital documents 304, 310).

In some embodiments, training of the second MLA classifier 204 can be executed with minimal supervision (i.e. with no or with minimal use of assessors). The second MLA classifier 204 is configured, as part of the training process, to determine the location and size of the logotype portion 402, the location and size being appropriate and sufficient for determining those document features associated therewith that can be used for training the second MLA classifier 204. In some embodiments of the present technology, the second MLA classifier 204 analyzes a plurality of training digital documents 304, 310 to determine various document elements contained therein, as well as physical characteristics of the various image elements. If multiple training digital documents 304, 310 contain images as certain document elements, the second MLA classifier 204 uses document features associated therewith for training.

If, on the other hand, the plurality of training digital documents 304, 310 does not contain images, the second MLA classifier 204 uses the pre-determined portion of the digital document in lieu of the images. If the document features of the pre-determined portion are substantially similar amongst different ones of the plurality of training digital documents 304, 310, then the second MLA classifier 204 stores the indication of the content of the pre-determined portion and uses same in training/during operation of the second MLA classifier 204.

In alternative embodiments of the present technology, the second MLA classifier 204 can be trained on assessor-marked plurality of training digital documents 304, 310. More specifically, assessor(s) can identify, within each of the plurality of training digital documents 304, 310, a location and an outline of the logo (or other images to be used in lieu of the logo). The second MLA classifier 204 then extracts document features associated with such identified logos.

Once the second MLA classifier 204 is trained, the validation sub-phase commences. If as part of training and validation it is determined that the second MLA classifier 204 confidently determines certain document type(s), an indication thereof is populated as the second record 512 in the above-described document type determination matrix 500. Just like the first MLA classifier 202, if when in use, the second MLA classifier 204 determines the document type of the unknown digital document 114A, 114B being processed for which an indication is stored in the indication of document types 506, further ones of the plurality of MLA classifiers 110 are not executed for the given unknown digital document 114A, 114B.

Third MLA Classifier 206—Rule-Based Classifier Training

Generally speaking, the third MLA classifier 206 is configured to execute an OCR function on at least a portion of content of the training digital documents 304, 310 (as well as of content of unknown digital documents 114A, 114B being processed, when in-use after having been trained). Hence, the processing time associated with the third MLA classifier 206 is comparatively longer when compared to the second MLA classifier 204 (and to the first MLA classifier 202 for that matter).

Training of the third MLA classifier 206 can be executed in a stepped approach. During a first step, the third MLA classifier 206 executes an OCR function on a portion of the content of training digital documents 304, 310 (for example, the portion of the content can be an entirety of the logotype portion 402).

Once the OCR function has been performed, the third MLA classifier 206 extracts all words contained in the OCR-ed portion of the content of the training digital document 304, 310. These extracted words are then processed for identification of candidates for document features (i.e. word based document features). How the third MLA classifier 206 identifies candidates for document features is not particularly limited. As an example, the third MLA classifier 206, can first identify all words of above a pre-determined length and of pre-determined lexical characteristic(s) that are shared between all training digital documents 304, 310 of a given document type. The third MLA classifier 206 then prunes the candidates by removing all those words that are also present in training digital documents 304, 310 of other document types to generate a unique set of words for each document type.

The third MLA classifier 206 then generates a respective rule for each of the document types by adding all of the words in the unique set of words to the rule. The third MLA classifier 206 can then apply the rule to the unknown digital documents 114A, 114B. For example, a sample rule can stipulate that in order for the third MLA classifier 206 to identify the unknown digital document 114A, 114B as being of a certain document type, the unknown digital document 114A, 114B must contain a pre-defined proportion of words in the rule associated with the certain document type. The pre-defined proportion can be pre-defined to be seventy percent, eighty percent, ninety percent, or any other suitable percentage.

As part of training of the third MLA classifier 206, the third MLA classifier 206 also determines the size of the pre-determined portion that it needs to process using the OCR function in order to confidently identify the document type. Identification of such size is executed by merging the sizes of all portions that contain identified words of the unique set of words of training digital documents 304, 310 with an optional size error margin added thereto.

The third MLA classifier 206 is then validated using a validation set of digital documents 114A, 114B much akin to what was described above in relation to the first MLA classifier 202 and the second MLA classifier 204.

An indication of the document types confidently identified by the third MLA classifier 206 and the sizes of the required portions of digital documents 114A, 114B to be processed are stored, respectively, in the indication of document types 506 and the indication of processing flags 508 as the third record 514.

Just like the second MLA classifier 204 and first MLA classifier 202, if when in use, the third MLA classifier 206 determines the document type of the unknown digital document 114A, 114B being processed for which an indication is stored in the indication of document types 506, further ones of the plurality of MLA classifiers 110 are not executed for the given unknown digital document 114A, 114B.

Fourth MLA Classifier 208—Full Text Classifier Training

The fourth MLA classifier 208 (being implemented as a full text classifier) is associated with a placement in the hierarchical order 210 of execution immediately following that of the third MLA classifier 206. The fourth MLA classifier 208 is associated with relatively longer processing time (and more computing resources) required to output the document type prediction. The fourth MLA classifier 208 uses the output of an OCR function having been run on an entirety or almost the entirety of the content of the training digital documents 304, 310 to train, and the entirety or almost the entirety of the content of the unknown digital documents 114A, 114B to be processed for outputting the prediction.

It is noted that in this embodiment, the fourth MLA classifier 208 can identify document type of any type of digital document 114A, 114B, including those of an unstructured document type.

As part of training, the fourth MLA classifier 208 determines and stores an indication of a portion of the content of the plurality of training digital documents 304, 310 that has a minimum possible size, yet is sufficient for providing document features required for confident identification of the document type. Depending on the document type, such minimum possible size is between one-third of the page size and an entire page size.

Once the fourth MLA classifier 208 is trained and validated, the indication of which document types the fourth MLA classifier 208 is configured to determine is stored within the indication of the document types 506 of the fourth record 516 in the document type determination matrix 500. Additionally, the fourth MLA classifier 208 also populates the indication of processing flags 508 (for example, an indication of the minimum portion of the content that needs to be OCR processed to determine the document type, etc.).

In some embodiments, where either during training or in-use, the third MLA classifier 206 has performed the OCR function on a certain portion of the given digital document 114A, 114B; the fourth MLA classifier 208 can re-use output of the OCR function on the third MLA classifier 206 for the given digital document 114A, 114B and only perform an additional OCR function on the remainder of content of the given digital document 114A, 114B.

Plurality of Additional MLA Classifiers 209

Even though the above has provided a detailed description of training of the first MLA classifier 202, the second MLA classifier 204, the third MLA classifier 206, and the fourth MLA classifier 208; the plurality of MLA classifiers 110 can include a number of others of the plurality of additional MLA classifiers 209, which can also be trained similarly to or differently from the first MLA classifier 202, the second MLA classifier 204, the third MLA classifier 206, and the fourth MLA classifier 208 and associated with a placement in the hierarchical order 210 of execution in a manner much akin to the first MLA classifier 202, the second MLA classifier 204, the third MLA classifier 206, and the fourth MLA classifier 208.

In accordance with some of the embodiments of the present technology, each sequential training of the plurality of MLA classifiers 110 is executed on training digital documents 304, 310 of a document type which was not confidently determined by a MLA classifier of an earlier placement in the hierarchical order 210 of execution. In other words, where the first MLA classifier 202 has been trained on a first set of training objects, the second MLA classifier 204 has been trained on a second set of training objects, the third MLA classifier 206 has been trained on a third set of training objects; and the fourth MLA classifier 208 has been trained on a fourth set of training objects; it can be said that:

- the second set of training objects does not include at least some document features of the first set of training objects;
- the third set of training objects does not include at least some document features of the first set of training objects and the second set of training objects; and
- the fourth set of training objects does not include at least some document features of the first set of training objects, the second set of training objects and the third set of training objects.

Given the architecture described above, it is possible to execute a method for training the plurality of MLA classifiers 110, the plurality of MLA classifiers 110 to be trained in order to: (i) output a prediction of the document type for an unknown digital document 114A, 114B and (ii) the plurality of MLA classifiers 110 being ranked in a hierarchical order 210 of execution, wherein the immediately following one of the plurality of MLA classifiers 110 is only executed if a previous one has not confidently determined the document type.

Figure 6:
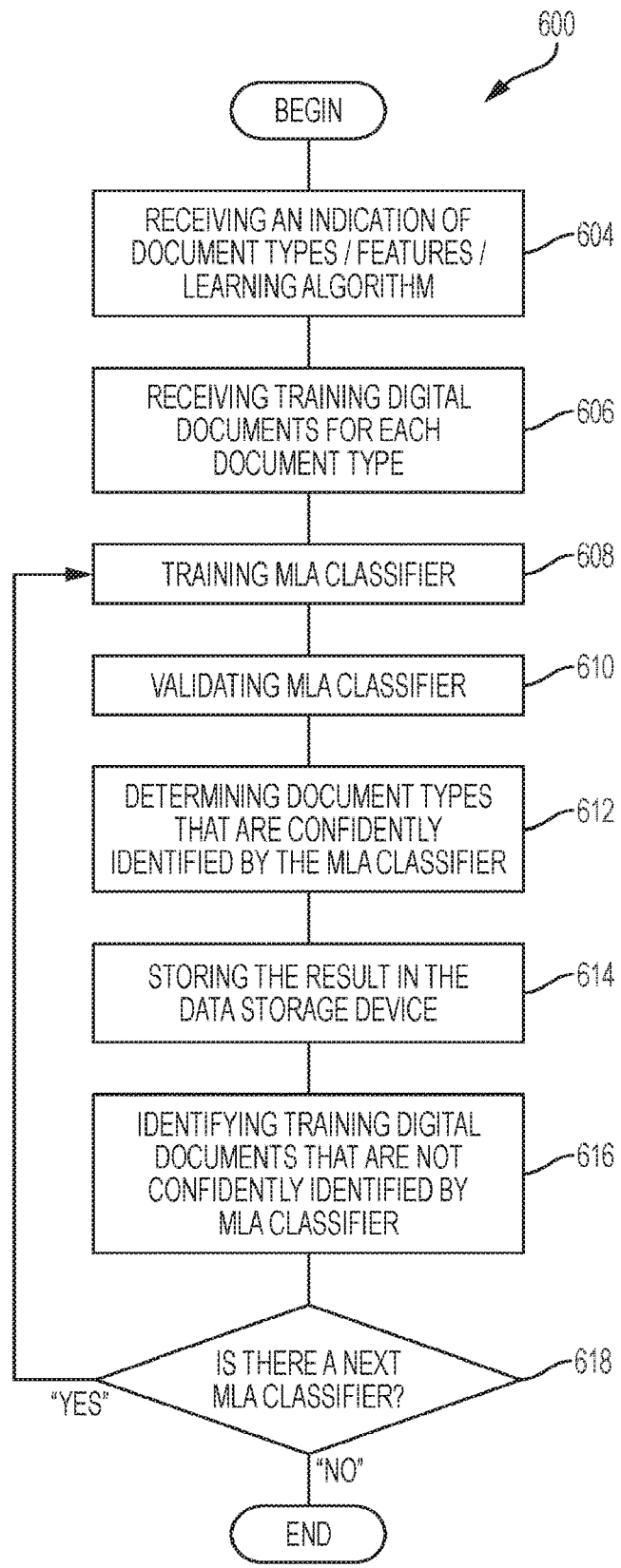
FIG. 6 depicts a block diagram of a non-limiting embodiment of a method for training the plurality of MLA classifiers of FIG. 2.

With reference to FIG. 6, there is depicted a non limiting embodiment of a block diagram of a method 600 for training the plurality of MLA classifiers 110. The method 600 can be executed by the processor 104. In some embodiments, the processor 104 can execute an MLA training routine (not separately depicted), which is used as a supervisory entity for training the plurality of MLA classifiers 110.

The method 600 begins at block 604, where the processor 104 receives an indication of at least some of classes (document types), features, MLA types to be used, etc. In some embodiments of the present technology, the processor 104 acquires the indication of at least some of classes (document types), features, MLA types to be used from an operator of the electronic device 102 (through a machine-user interface, such as a keyboard, which is not separately numbered).

At block 606, the processor 104 receives the plurality of training digital documents 304, 310. In some embodiments, the plurality of training digital documents 304, 310 are retrieved from the data storage device 105. In other embodiments, the plurality of training digital documents 304, 310 can be received via one (or both) of the digital document reader 118 and the network interface 106. In some embodiments of the present technology, the step of receiving at block 606 is executed in response to an interaction with an operator of the electronic device 102. In some embodiments of the present technology, the operator further provides an indication of types of the MLA classifiers to be used for the plurality of MLA classifiers 110. In some embodiments, the operator further provides an indication of the hierarchical order 210 of execution.

At block 608, the processor 104 executes training of the given one of the plurality of MLA classifiers 110. It is noted that selection of the given one of the plurality of MLA classifiers 110 is executed in accordance with the hierarchical order 210 of execution. Hence, the processor 104 first executes block 608 in relation to the first MLA classifier 202. How the training is executed has been explained above and depends on which one of the plurality of MLA classifiers 110 is being trained.

At block 610, the processor 104 executes validation (using for example, a cross-validation) of the given one of the plurality of MLA classifiers 110. The process of validation (re-training) has been described in greater detail above.

At block 612, the processor 104 determines which document type(s) the given one of the plurality of MLA classifiers 110 is trained to confidently predict. The given one of the plurality of MLA classifiers 110 is applied to a validation subset of training objects. The outputted predictions are then compared with the assigned labels (i.e. ground truth labels for the given validation set of documents) for the given validation subset of training documents using the validation metrics (precision and recall parameters). Precision and recall parameters are calculated for each predefined class of documents and then compared with the corresponding threshold values. If the calculated values of precision and recall parameters for the particular document type are greater than the corresponding threshold values, then the document type is considered as the MLA classifier confidently predictable document type, and if the calculated values of precision and recall parameters are lower than the corresponding threshold values, then the document type is considered as not being the MLA classifier confidently predictable document type.

In some embodiments of the present technology, as part of block 612, the given one of the plurality of MLA classifiers 110 analyzes one or more hypotheses for one or more document types associated with the validation digital document 114A, 114B and an associated respective confidence parameters. In some embodiments of the present technology, the given one of the plurality of MLA classifiers 110 further selects, from one or more hypotheses, the best hypothesis for the document type. In some embodiments of the present technology, the given one of the plurality of MLA classifiers 110 selects the best hypothesis for the document type based on (i) comparing the confidence parameter with a first pre-determined threshold and (ii) comparing a difference between the confidence parameter and a next-document-type confidence parameter (being associated with the next best hypothesis of the document type) with a second pre-determined threshold. In case both conditions are met, the best hypothesis is determined to be the outputted document type. In case of at least one of the conditions not being met, the given one of the plurality of MLA classifiers 110 determines that the given document type can not be confidently predicted by the given one of the plurality of MLA classifiers 110.

In some embodiments of the present technology, as part of block 612, the processor 104 further receives an indication of the pre-determined first and second threshold. In other embodiments the processor 104 can calculate the pre-determined first and second threshold based on an indication of the purpose of the prediction (and, hence, priority for accuracy, speed, number of predictions per time interval, etc.).

At block 614, the processor 104 stores an indication of the confidently predictable document type(s) in the document type determination matrix 500, which in turn is stored in the data storage device 105.

At block 616, the processor 104 determines which ones of the training digital documents 304, 310 are associated with document types which are not confidently determined by the given one of the plurality of MLA classifiers 110.

At block 618, the processor 104 determines if there are any additional ones of the plurality of MLA classifiers 110 available for training.

If the answer at block 618 is "YES", the processor 104 returns to block 608 and trains the next MLA classifier, i.e. the MLA classifier with the immediately next placement in the hierarchical order 210 of execution. In the illustrated example, the processor 104 executes training of the second MLA classifier 204.

If the answer at block 618 is "NO" (i.e. if all of the plurality of MLA classifiers 110 have been trained), the method 600 terminates.

Put another way, the method 600 is a method of training the plurality of MLA classifiers 110, the plurality of MLA classifiers 110 for determining a document type of an unknown digital document 114A, 114B. The method 600 is executable by an electronic device associated with the plurality of MLA classifiers 110. The method 600 comprises:
sequentially training a first one of the plurality of MLA classifiers 110 and a second one of the plurality of MLA classifiers 110,
during the sequential training of the first one and the second one of the plurality of MLA classifiers 110, determining:
a first document type (which can be one or more document types) confidently identifiable by the first one of the plurality of MLA classifiers 110;
a second document type (which can be one or more document types) confidently identifiable by the second one of the plurality of MLA classifiers 110; and
the hierarchical order 210 of execution of the first one and the second one of the plurality of MLA classifiers 110, the hierarchical order 210 of execution identified such that a respective set of document features used by the second one of the plurality of MLA classifiers 110 (the second one of the plurality of MLA classifiers 110 being associated with a placement in the hierarchical order 210 of execution immediately following that of the first one of the plurality of MLA classifiers 110) is comparatively heavier than a respective set of document features used by the first one of the plurality of MLA classifiers 110 (depicted as the direction 220 in FIG. 2).

Figure 7:
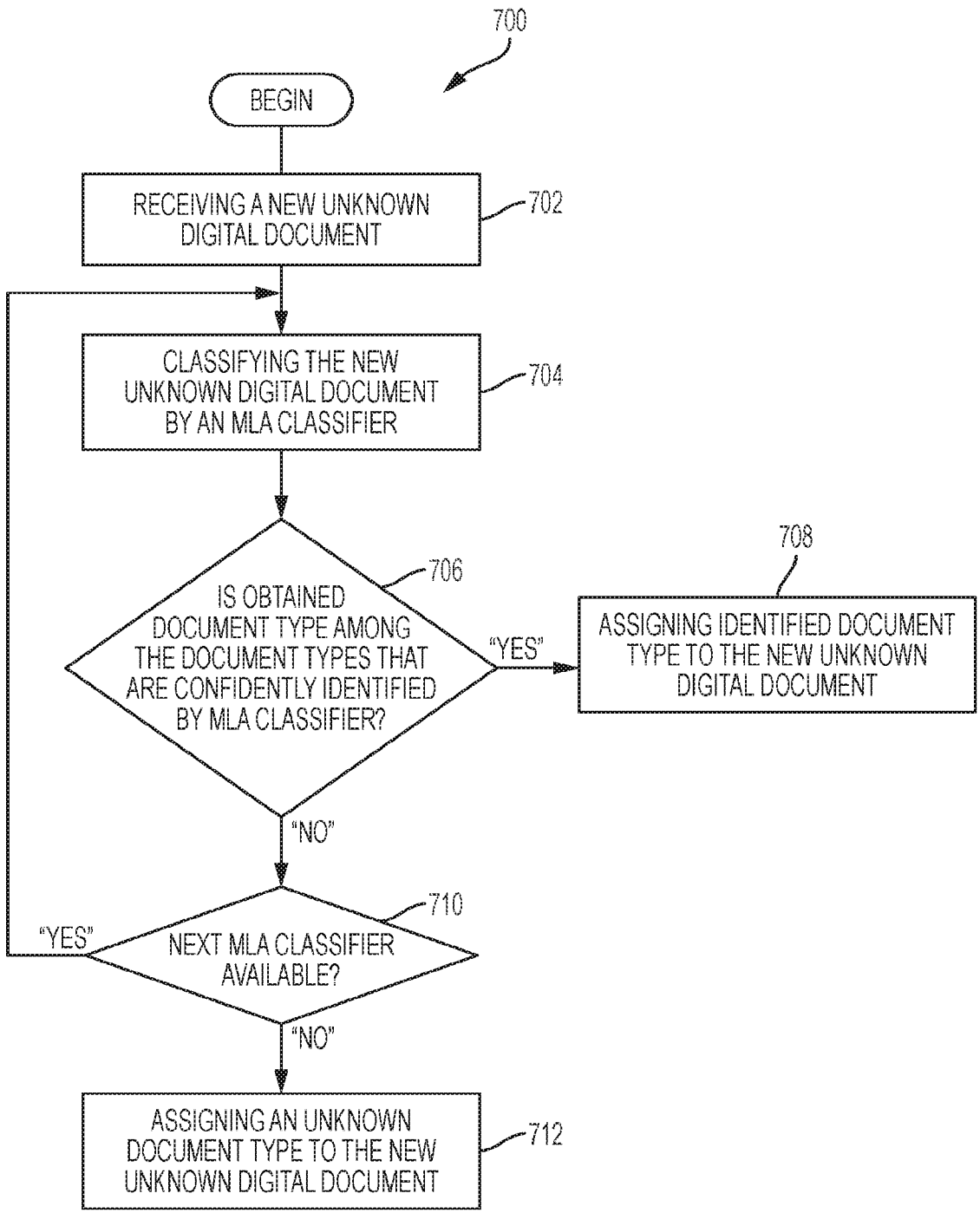
FIG. 7 depicts a block diagram of a non-limiting embodiment of a method of predicting a document type, using the plurality of MLA classifiers of FIG. 2 having been trained using the method of FIG. 6.

With reference to FIG. 7, there is depicted a non-limiting embodiment of a block diagram of a method 700 for determining the document type of the unknown digital document 114A, 114B. The method 700 can be executed by the processor 104 and, more specifically, by the plurality of MLA classifiers 110 that have been trained and validated using the method 600. It is noted that as part of the training the document type determination matrix 500 has been generated and the hierarchical order 210 of execution has also been determined.

The method 700 begins at block 702, wherein the processor 104 receives the unknown digital document 114A, 114B to be processed with an aim of determining a document type thereof How the unknown digital document 114A, 114B is received is not particularly limited. For example, it may have been scanned using the digital document reader 118 (such as a scanner or the like). Alternatively, the unknown digital document 114A, 114B may have been received as an attachment to an electronic message or otherwise downloaded from the network resource via the network interface 106. It is possible that the unknown digital document 114A, 114B may have been retrieved from the data storage device 105.

At block 704, the processor 104 executes classifying the unknown digital document 114A, 114B with an aim of determining the document type associated therewith. To achieve that end, the processor 104 executes a given one of the plurality of MLA classifiers 110, the given one being the earliest placed in the hierarchical order 210 of execution. It will be recalled that the first MLA classifier 202 is associated with the earliest placement in the hierarchical order 210 of execution, in this embodiment. The first MLA classifier 202 outputs a prediction of the document type, using the trained MLA formula 316.

In some embodiments of the present technology, the output of the first MLA classifier 202 includes one or more hypotheses of one or more document types associated with the unknown digital document 114A, 114B and an associated respective confidence parameters. In some embodiments of the present technology, the first MLA classifier 202 further selects, from one or more hypotheses, the best hypothesis for the document type. In some embodiments of the present technology, the first MLA classifier 202 selects the best hypothesis for the document type based on (i) comparing the confidence parameter with a first pre-determined threshold and (ii) comparing a difference between the confidence parameter and a next-document-type confidence parameter (being associated with the next best hypothesis of the document type) with a second pre-determined threshold. In case both conditions are met, the best hypothesis is determined to be the outputted document type. In case of at least one of the conditions not being met, the first MLA classifier 202 determines that the given document type can not be confidently predicted by the first MLA classifier 202.

In a specific implementation, the first MLA classifier 202 determines one or more hypotheses of the document type using document features extracted from the unknown digital document 114A, 114B (the document features so extracted being specific document features on which the first MLA classifier 202 has been trained and subject to any processing flags stored in the indication of processing flags 508 as part of the first record 510)

At block 706, the processor 104 determines if the predicted document type is one for which the first MLA classifier 202 has been determined to confidently output the document type.

To this end, the processor 104 accesses the indication of document types 506 stored in the first record 510. In response to the indication of the outputted document type being stored in the document type determination matrix 500 in association with the first MLA classifier (the "YES" branch of block 706), the method 700 proceeds to block 708, where the processor 104 assigns the predicted document type (as outputted by the first MLA classifier 202) to the digital document 114A, 114B. It is noted that the document type assignment is executed without executing any additional MLA classifiers of the plurality of MLA classifiers 110.

If, on the other hand, the indication of the outputted document type is not stored in the document type determination matrix 500 in association with the first MLA classifier (the "NO" branch of block 706), the method 700 proceeds to block 710, where the processor 104 determines if a next MLA classifier is available. More specifically, the processor 104 determines if there exists another one of the plurality of MLA classifiers 110 associated with the next placement in the hierarchical order 210 of execution.

In response to there being another one of the plurality of MLA classifiers 110 (the "YES" branch of block 710), the processor 104 returns to block 704, where the processor 104 executes block 704 with the MLA classifier with the immediately next placement in the hierarchical order 210 of execution (in this examples, the second MLA classifier 204).

If, on the other hand, there are no more MLA classifiers left to execute (the "NO" branch of block 710), which is indicative of the processor 104 having executed all of the plurality of MLA classifiers 110 without having been successful at determining the document type with a confidence parameter above the pre-determined threshold, the method 700 proceeds to block 712, where the processor 104 assign an "unknown" document type to the unknown digital document 114A, 114B. The processor 104 can also execute an exception handling routine at block 712, such as sending the unknown digital document 114A, 114B to a human assessor or the like.

The method 700 then terminates.

Figure 8:
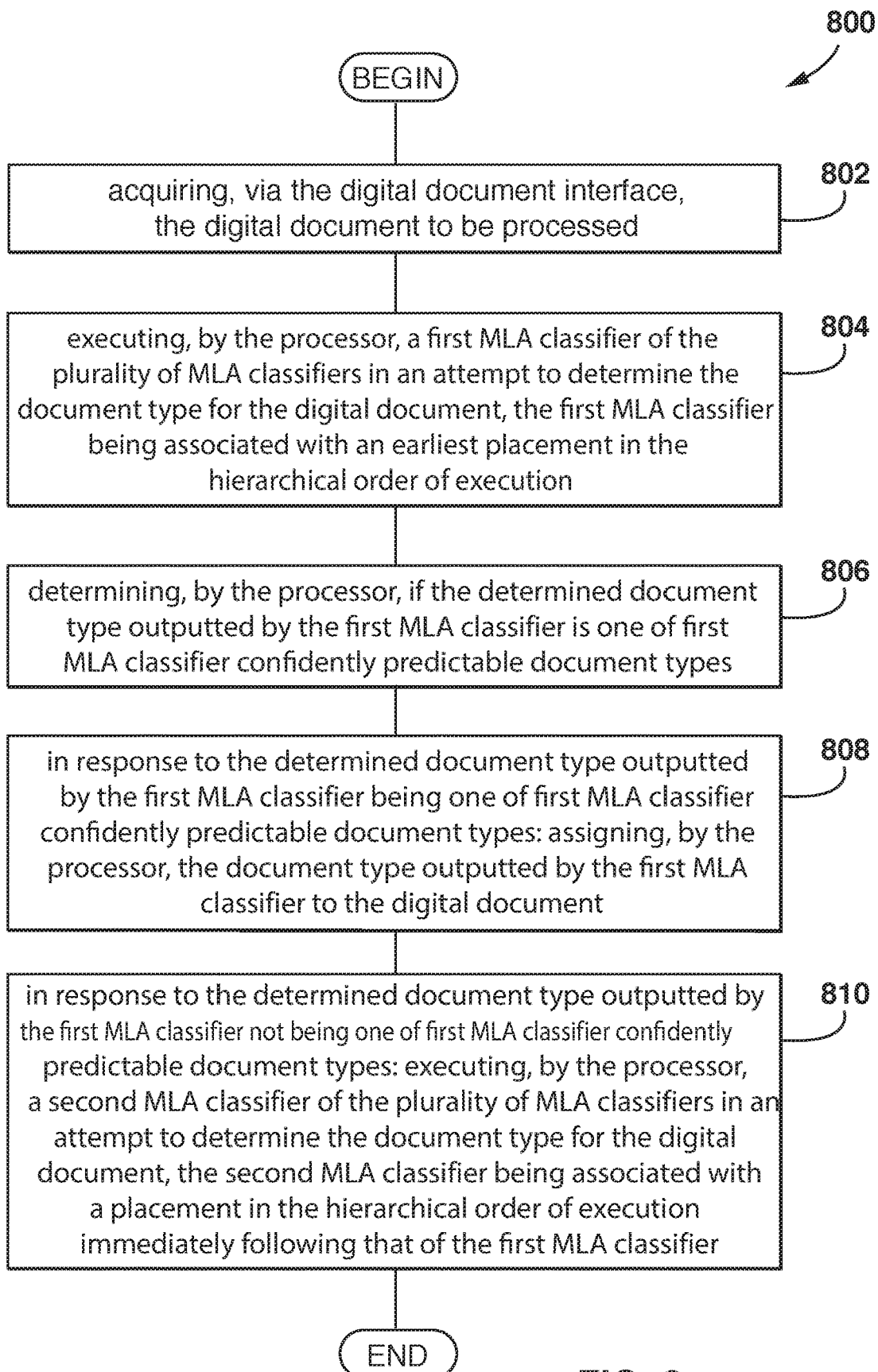
FIG. 8 depicts a block diagram of another non-limiting embodiment of a method of predicting a document type, using the plurality of MLA classifiers of FIG. 2 having been trained using the method of FIG. 6.

With reference to FIG. 8, there is depicted another non-limiting embodiment of a block diagram of a method 800 for determining the document type associated with the unknown digital document 114A, 114B. The method 800 can be executed by the processor 104 and, more specifically, by the plurality of MLA classifiers 110 that have been trained and validated using the method 600. It is noted that as part of that training the document type determination matrix 500 has been generated and the hierarchical order 210 of execution has also been determined.

At block 802, the processor 104 executes acquiring, via the digital document interface, the digital document 114A, 114B to be processed. How the unknown digital document 114A, 114B is received is not particularly limited. For example, it may have been scanned using the digital document reader 118 (such as a scanner or the like). Alternatively, the unknown digital document 114A, 114B may have been received as an attachment to an electronic message or otherwise downloaded from the network resource via the network interface 106. It is possible that the unknown digital document 114A, 114B may have been retrieved from the data storage device 105.

At block 804, the processor 104 executes the first MLA classifier 202 of the plurality of MLA classifiers 110 in an attempt to determine the document type for the unknown digital document 114A, 114B, the first MLA classifier 202 being associated with an earliest placement in the hierarchical order 210 of execution.

At block 806, the processor 104 determines if the determined document type outputted by the first MLA classifier is one of first MLA classifier confidently predictable document types.

As part of determining if the determined document type outputted by the first MLA classifier 202 is one of first MLA classifier confidently predictable document types, the processor 104 accesses the document type determination matrix 500 and checks if the indication of the outputted document type is stored in the document type determination matrix 500 in association with the first MLA classifier 202.

At block 808, the processor 104 executes, in response to the determined document type outputted by the first MLA classifier 202 being one of first MLA classifier confidently predictable document types: assigning, the document type outputted by the first MLA classifier to the digital document. In some embodiments of the method 800, as part of block 808, the processor 104 is configured to execute assigning the outputted document type without executing any other ones of the plurality of MLA classifiers 110.

At block 810, the processor 104 executes (in response to the determined document type outputted by the first MLA classifier not being one of first MLA classifier confidently predictable document types) a second MLA classifier of the plurality of MLA classifiers in an attempt to determine the document type for the digital document, the second MLA classifier being associated with a placement in the hierarchical order of execution immediately following that of the first MLA classifier Some Optional/Additional Features of the Method 800.

In some embodiments of the method 800, the processor 104 repeats blocks 804-810 with the second MLA classifier 204. More specifically, in response to the determined document type outputted by the second MLA classifier 204 being one of second MLA classifier confidently predictable document types: the processor 104 executes assigning the document type outputted by the second MLA classifier 204 to the digital document 114A, 114B; and in response to the determined document type outputted by the second MLA classifier 204 not being one of second MLA classifier confidently predictable document types: executing the third MLA classifier 206 of the plurality of MLA classifiers 110 in an attempt to determine the document type for the unknown digital document 114A, 114B, the third MLA classifier 206 being associated with a placement in the hierarchical order 210 of execution immediately following that of the second MLA classifier 204.

The method 800 can then be repeated with the fourth MLA classifier 208 should the third MLA classifier 206 fail to determine the document type for which the third MLA classifier 206 is trained to confidently predict document types.

In embodiments of the method 800, the document type can be selected from one of: a rigidly-structured document, a nearly-rigidly-structured document, a semi-structured document, and an un-structured document.

In embodiments of the method 800, the method 800 further includes, based on the document type, executing at least one computer-executable action with respect to the digital document 114A, 114B.

More specifically, once the processor 104 determines the document type of the unknown digital document 114A, 114B; the processor 104 can execute the at least one computer-executable action with respect to the digital document 114A, 114B; the at least one computer-executable action being selected based on the document type associated therewith. The type of the at least one computer-executable action is not limited—and numerous types of further processing algorithms for the digital document 114A, 114B are envisioned. An example of a system that can use such predicted document type is disclosed in US patent application bearing a Publication Number US 2011/0188759 by Filimonova et al, published on Aug. 4, 2011; content of which is hereby incorporated by reference it its entirety.

In a specific example of an implementation of the present technology, the computer-executable action can be: creating of a template for the given determined document type.

It should be expressly understood that not all technical effects mentioned herein need to be obtained in each and every embodiment of the present technology. For example, embodiments of the present technology may be implemented without the user receiving the benefit some of these technical effects, while other embodiments may be implemented with the user obtaining other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method, comprising:

executing, by a processor, a first machine learning algorithm (MLA) classifier in order to determine a document type for a digital document, wherein the first MLA classifier is associated with a first hierarchical order of execution, and wherein the first MLA classifier is trained on a first trained dataset containing a first document type and a second document type, wherein the first document type is confidently predictable by the first MLA classifier and the second document type is not confidently predictable by the first MLA classifier; and responsive to determining that the first MLA classifier produced the second document type for the digital document, executing a second MLA classifier in order to determine the document type for the digital document, wherein the second MLA classifier is associated with a second hierarchical order of execution following the first hierarchical order of execution, and wherein the second MLA classifier is trained on a second trained dataset containing no documents of the first document type.

2. The method of claim 1, further comprising:
responsive to determining that the first MLA classifier produced the first document type for the digital document, assigning the first document type to the digital document.

3. The method of claim 1, further comprising:
determining that the second MLA classifier produced the second document type for the digital document, wherein the second document type is confidently predictable by the second MLA classifier; and
assigning the second document type to the digital document.

4. The method of claim 1, further comprising:
determining that the second MLA classifier produced the second document type for the digital document, wherein the second document type is not confidently predictable by the second MLA classifier; and
executing a third MLA classifier in order to determine the document type for the digital document, wherein the third MLA classifier is associated with a third hierarchical order of execution following the second hierarchical order of execution.

5. The method of claim 1, wherein the first MLA classifier is provided by at least one of: a raster-based classifier, a logotype-based classifier, a text-based classifier, or a rule-based classifier.

6. The method of claim 1, wherein the first document type is associated with a confidence parameter which is above a pre-determined threshold.

7. The method of claim 1, wherein the first document type is associated with a confidence parameter, and wherein a difference between the confidence parameter and a next-document-type hypothesis confidence parameter is above a pre-determined threshold.

8. The method of claim 1, further comprising:
based on the document type, executing a computer-executable action with respect to the digital document.

9. A system, comprising:
a memory;
a processor coupled to the memory, wherein the processor is configured to:
execute a first machine learning algorithm (MLA) classifier in order to determine a document type for a digital document, wherein the first MLA classifier is associated with a first hierarchical order of execution, and wherein the first MLA classifier is trained on a first trained dataset containing a first document type and a second document type, wherein the first document type is confidently predictable by the first MLA classifier and the second document type is not confidently predictable by the first MLA classifier; and
responsive to determining that the first MLA classifier produced the second document type for the digital document, execute a second MLA classifier in order to determine the document type for the digital document, wherein the second MLA classifier is associated with a second hierarchical order of execution following the first hierarchical order of execution, and wherein the second MLA classifier is trained on a second trained dataset containing no documents of the first document type.

10. The system of claim 9, wherein the processor is further configured to:
responsive to determining that the first MLA classifier produced the first document type for the digital document, assign the first document type to the digital document.

11. The system of claim 9, wherein the processor is further configured to:
determining that the second MLA classifier produced the second document type for the digital document, wherein the second document type is confidently predictable by the second MLA classifier; and
assign the second document type to the digital document.

12. The system of claim 9, wherein the processor is further configured to:
determine that the second MLA classifier produced the second document type for the digital document, wherein the second document type is not confidently predictable by the second MLA classifier; and
execute a third MLA classifier in order to determine the document type for the digital document, wherein the third MLA classifier is associated with a third hierarchical order of execution following the second hierarchical order of execution.

13. The system of claim 9, wherein the first MLA classifier is provided by at least one of: a raster-based classifier, a logotype-based classifier, a text-based classifier, or a rule-based classifier.

14. The system of claim 9, wherein the first document type is associated with a confidence parameter which is above a pre-determined threshold.

15. The system of claim 9, wherein the first document type is associated with a confidence parameter, and wherein a difference between the confidence parameter and a next-document-type hypothesis confidence parameter is above a pre-determined threshold.

16. The system of claim 9, wherein the processor is further configured to:
based on the document type, execute a computer-executable action with respect to the digital document.

17. A computer-readable non-transitory storage medium comprising executable instructions that, when executed by a computer system, cause the computer system to:

execute a first machine learning algorithm (MLA) classifier in order to determine a document type for a digital document, wherein the first MLA classifier is associated with a first hierarchical order of execution, and wherein the first MLA classifier is trained on a first trained dataset containing a first document type and a second document type, wherein the first document type is confidently predictable by the first MLA classifier and the second document type is not confidently predictable by the first MLA classifier; and responsive to determining that the first MLA classifier produced the second document type for the digital document, execute a second MLA classifier in order to determine the document type for the digital document, wherein the second MLA classifier is associated with a second hierarchical order of execution following the first hierarchical order of execution, and wherein the second MLA classifier is trained on a second trained dataset containing no documents of the first document type.

18. The computer-readable non-transitory storage medium of claim 17, further comprising executable instructions causing the computer system to:

responsive to determining that the first MLA classifier produced the first document type for the digital document, assigning the first document type to the digital document.

19. The computer-readable non-transitory storage medium of claim 17, further comprising executable instructions causing the computer system to:

determining that the second MLA classifier produced the second document type for the digital document, wherein the second document type is confidently predictable by the second MLA classifier; and assigning the second document type to the digital document.

20. The computer-readable non-transitory storage medium of claim 17, further comprising executable instructions causing the computer system to:

determining that the second MLA classifier produced the second document type for the digital document, wherein the second document type is not confidently predictable by the second MLA classifier; and executing a third MLA classifier in order to determine the document type for the digital document, wherein the third MLA classifier is associated with a third hierarchical order of execution following the second hierarchical order of execution.

* * * * *